US011967284B2

(12) United States Patent
Lee et al.

(10) Patent No.: US 11,967,284 B2
(45) Date of Patent: Apr. 23, 2024

(54) DISPLAY APPARATUS

(71) Applicant: Samsung Display Co., LTD., Yongin-si (KR)

(72) Inventors: Hyo-Jin Lee, Yongin-si (KR); Sehyuk Park, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/257,265

(22) PCT Filed: Jun. 21, 2019

(86) PCT No.: PCT/KR2019/007560

§ 371 (c)(1),
(2) Date: Dec. 30, 2020

(87) PCT Pub. No.: WO2020/017771

PCT Pub. Date: Jan. 23, 2020

(65) Prior Publication Data

US 2021/0241699 A1 Aug. 5, 2021

(30) Foreign Application Priority Data

Jul. 18, 2018 (KR) ........................ 10-2018-0083343

(51) Int. Cl.
*G09G 3/3258* (2016.01)
*G09G 3/3233* (2016.01)
*G09G 3/3291* (2016.01)

(52) U.S. Cl.
CPC ......... *G09G 3/3258* (2013.01); *G09G 3/3291* (2013.01); *G09G 2300/0819* (2013.01);
(Continued)

(58) Field of Classification Search
CPC ............... G09G 3/3258; G09G 3/3233; G09G 2320/0247; G09G 2300/0819
See application file for complete search history.

(56) References Cited

U.S. PATENT DOCUMENTS 9,165,518 B2 10/2015 Choi et al.
9,984,623 B2 5/2018 An et al.
(Continued)

FOREIGN PATENT DOCUMENTS

CN 106920527 A 7/2017
KR 1020160022450 A 3/2016
(Continued)

OTHER PUBLICATIONS

International Search Report dated Sep. 25, 2019 for PCT/KR2019/007560.

*Primary Examiner* — Xuemei Zheng
(74) *Attorney, Agent, or Firm* — CANTOR COLBURN LLP

(57) ABSTRACT

A display device includes a display panel and a display panel driver. The display panel includes a pixel having a switching element of a first type and a switching element of a second type different from the first type. The display panel driver drives the display panel. In a first mode, the display panel driver drives the switching element of the first type and the switching element of the second type with a high driving frequency. In a second mode, the display panel driver drives the switching element of the first type with the high driving frequency and the switching element of the second type with low driving frequency which is lower than the high driving frequency. In a third mode, the display panel driver drives the switching element of the first type and the switching element of the second type with the low driving frequency.

20 Claims, 21 Drawing Sheets

(52) U.S. Cl.
CPC ............... *G09G 2320/0247* (2013.01); *G09G 2330/028* (2013.01)

(56) References Cited

U.S. PATENT DOCUMENTS

| | | | | |
|---|---|---|---|---|
| 10,777,133 | B2 | 9/2020 | Jeon et al. | |
| 2012/0026137 | A1* | 2/2012 | Park | G09G 3/2096 345/204 |
| 2014/0146031 | A1* | 5/2014 | Lee | G11C 19/28 345/212 |
| 2015/0145900 | A1* | 5/2015 | Lee | G09G 3/36 345/691 |
| 2015/0340014 | A1 | 11/2015 | Kim et al. | |
| 2016/0124491 | A1 | 5/2016 | An et al. | |
| 2017/0092198 | A1* | 3/2017 | Ryu | G09G 3/3233 |
| 2017/0132964 | A1 | 5/2017 | Lee et al. | |
| 2017/0206850 | A1 | 7/2017 | Kim et al. | |
| 2017/0221445 | A1* | 8/2017 | Wu | G09G 3/3696 |
| 2017/0270856 | A1* | 9/2017 | Ebisuno | H01L 27/3265 |
| 2020/0074945 | A1 | 3/2020 | Chen | |

FOREIGN PATENT DOCUMENTS

| | | | |
|---|---|---|---|
| KR | 1020160045215 | A | 4/2016 |
| KR | 1020160052942 | A | 5/2016 |
| KR | 1020170005210 | A | 1/2017 |
| KR | 1020170049735 | A | 5/2017 |
| KR | 1020180056442 | A | 5/2018 |
| KR | 1020180063425 | A | 6/2018 |
| KR | 1020170036934 | A | 10/2022 |

* cited by examiner

| DRIVING FREQUENCY | THC | FREQUENCY OF COMPENSATION FRAME | NUMBER OF COMPENSATION FRAME |
|---|---|---|---|
| 1Hz | 10 seconds | 60Hz | ≥20 |
| 2Hz | 10 seconds | 60Hz | ≥10 |
| ⋮ | ⋮ | ⋮ | ⋮ |
| 15Hz | 10 seconds | 60Hz | ≥2 |
| 30Hz | 10 seconds | 60Hz | ≥1 |

FIG. 20B

| DRIVING FREQUENCY | THC | FREQUENCY OF COMPENSATION FRAME | NUMBER OF COMPENSATION FRAME |
|---|---|---|---|
| 1Hz | 10 seconds | 60Hz | ≥20 |
| 2Hz | 20 seconds | 60Hz | ≥10 |
| ⋮ | ⋮ | ⋮ | ⋮ |
| 15Hz | 60 seconds | 60Hz | ≥2 |
| 30Hz | 120 seconds | 60Hz | ≥1 |

FIG. 20C

| DRIVING FREQUENCY | THC | FREQUENCY OF COMPENSATION FRAME | NUMBER OF COMPENSATION FRAME |
|---|---|---|---|
| 1Hz | 10 seconds | >1Hz | ≥20 |
| 2Hz | 10 seconds | >2Hz | ≥10 |
| ⋮ | ⋮ | ⋮ | ⋮ |
| 15Hz | 10 seconds | >15Hz | ≥2 |
| 30Hz | 10 seconds | >30Hz | ≥1 |

DISPLAY APPARATUS

TECHNICAL FIELD

Example embodiments of the present inventive concept relate to a display apparatus. More particularly, embodiments of the present inventive concept relate to a display apparatus reducing a power consumption and enhancing a display quality.

BACKGROUND

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

When an image displayed on the display panel is a static image or the display panel is operated in always-on mode, a driving frequency of the display panel may be decreased to reduce a power consumption.

When the driving frequency of the display panel is decreased, a flicker may be shown to a user and a display defect may be generated due to a shift of a threshold voltage. Therefore, a display quality of the display panel may be deteriorated.

SUMMARY

Technical Purpose

Example embodiments of the present inventive concept provide a display apparatus capable of reducing a power consumption and enhancing a display quality.

Technical Solution

In an embodiment of a display apparatus according to the present inventive concept, the display apparatus includes a display panel and a display panel driver. The display panel includes a pixel including a switching element of a first type and a switching element of a second type different from the first type. The display panel driver is configured to drive the display panel. The display panel driver is configured to drive the switching element of the first type in a high driving frequency and the switching element of the second type in the high driving frequency in a first mode. The display panel driver is configured to drive the switching element of the first type in the high driving frequency and the switching element of the second type in a low driving frequency lower than the high driving frequency in a second mode. The display panel driver is configured to drive the switching element of the first type in the low driving frequency and the switching element of the second type in the low driving frequency in a third mode.

In an embodiment, the switching element of the first type may be a polysilicon thin film transistor. The switching element of the second type may be an oxide thin film transistor.

In an embodiment, the switching element of the first type may be a P-type transistor. The switching element of the second type may be an N-type transistor.

In an embodiment, the pixel may include a first pixel switching element including a control electrode connected to a first node, an input electrode connected to a second node and an output electrode connected to a third node, a second pixel switching element including a control electrode to which a first data write gate signal is applied, an input electrode to which a data voltage is applied and an output electrode connected to the second node, a third pixel switching element including a control electrode to which a second data write gate signal is applied, an input electrode connected to the first node and an output electrode connected to the third node, a fourth pixel switching element including a control electrode to which a data initialization gate signal is applied, an input electrode to which an initialization voltage is applied and an output electrode connected to the first node, a fifth pixel switching element including a control electrode to which an emission signal is applied, an input electrode to which a high power voltage is applied and an output electrode connected to the second node, a sixth pixel switching element including a control electrode to which the emission signal is applied, an input electrode connected to the third node and an output electrode connected to an anode electrode of an organic light emitting element, a seventh pixel switching element including a control electrode, an input electrode to which the initialization voltage is applied and an output electrode connected to the anode electrode of the organic light emitting element, a storage capacitor including a first electrode to which the high power voltage is applied and a second electrode connected to the first node and the organic light emitting element including the anode electrode connected to the output electrode of the sixth switching element and a cathode electrode to which a low power voltage is applied.

In an embodiment, the first pixel switching element, the second pixel switching element, the fifth pixel switching element and the sixth pixel switching element may be the polysilicon thin film transistors. The third pixel switching element, the fourth pixel switching element and the seventh pixel switching element may be the oxide thin film transistors.

In an embodiment, the control electrode of the seventh pixel switching element may be connected to the control electrode of the sixth pixel switching element or receive an organic light emitting element initialization gate signal.

In an embodiment, the first pixel switching element, the second pixel switching element, the fifth pixel switching element, the sixth pixel switching element and the seventh pixel switching element may be the polysilicon thin film transistors. The third pixel switching element and the fourth pixel switching element may be the oxide thin film transistors.

In an embodiment, the first mode may be a high frequency driving mode. The second mode may be a low frequency hybrid driving mode. The third mode may be a low frequency driving mode. When an input image represents a moving image, the display panel may be driven in the first mode. When the input image represents a static image and the display apparatus is in a hybrid driving mode, the display panel may be driven in the second mode. When the input image represents a static image and the display apparatus is not in the hybrid driving mode, the display panel may be driven in the third mode.

In an embodiment, the display panel driver may be configured to determine a flicker value of the input image.

The display panel driver may be configured to determine the low driving frequency according to the flicker value of the input image.

In an embodiment, when the input image represents a static image and a difference between a maximum luminance of the input image and a minimum luminance of the input image is equal to or less than a first reference value, the display panel driver may be configured to drive the display panel in the second mode. When the input image represents a static image and the difference between the maximum luminance of the input image and the minimum luminance of the input image is greater than the first reference value, the display panel driver may be configured to drive the display panel in the third mode.

In an embodiment, when the input image represents a static image and a size of an image having the same grayscale value in the input image is greater than a second reference value, the display panel driver may be configured to drive the display panel in the second mode. When the input image represents a static image and the size of the image having the same grayscale value in the input image is equal to or less than the second reference value, the display panel driver may be configured to drive the display panel in the third mode.

In an embodiment, the display panel driver may be configured to divide the input image into a plurality of segments and configured to determine segment driving frequencies for the segments. When an absolute value of a difference between a number of worst segments that have a highest segment driving frequency among the segments and a number of majority segments that have a most frequent segment driving frequency among the segments, is greater than a third reference value, the display panel driver may be configured to drive the display panel in a compensation driving frequency less than the highest segment driving frequency of the worst segment.

In an embodiment, when the absolute value of the difference between the number of the worst segments and the number of the majority segments is greater than the third reference value, the display panel driver may be configured to compensate data of the worst segment.

In an embodiment, a second data write gate signal and a data initialization gate signal applied to the display panel may have the low driving frequency in the second mode. A first data write gate signal, an emission signal and an organic light emitting element initialization gate signal applied to the display panel may have the high driving frequency in the second mode.

In an embodiment, a first data write gate signal, a second data write gate signal, a data initialization gate signal, an emission signal and an organic light emitting element initialization gate signal applied to the display panel may have the low driving frequency in the second mode. A low power voltage applied to a cathode electrode of an organic light emitting element of the display panel may have the high driving frequency in the second mode.

In an embodiment of a display apparatus according to the present inventive concept, the display apparatus includes a display panel and a display panel driver. The display panel includes a pixel including a switching element of a first type and a switching element of a second type different from the first type. The display panel driver is configured to drive the display panel. The display panel driver is configured to drive the switching element of the first type a high driving frequency and the switching element of the second type in the high driving frequency in a first mode. The display panel driver is configured to drive at least one of the switching element of the first type and the switching element of the second type in the low driving frequency in a second mode. The display panel driver is configured to count a duration of the second mode. When the duration of the second mode is greater than a reference time, a driving signal applied to at least one of the switching element of the first type and the switching element of the second type is changed.

In an embodiment, when the duration of the second mode is greater than the reference time, the display panel driver may be configured to insert a compensation frame having a compensation driving frequency greater than the low driving frequency.

In an embodiment, a data write gate signal and a data initialization gate signal applied to the display panel may be generated based on a gate-on voltage and a gate-off voltage. When the duration of the second mode is greater than the reference time, the display panel driver may be configured to decrease a level of the gate-off voltage.

In an embodiment, a data write gate signal and a data initialization gate signal applied to the display panel may be generated based on a gate-on voltage and a gate-off voltage. When the duration of the second mode is greater than the reference time, the display panel driver may be configured to increase a level of the gate-on voltage.

In an embodiment, when the duration of the second mode is greater than the reference time, the display panel driver may be configured to decrease a level of an initialization voltage applied to the display panel.

Effect of the Invention

According to the display apparatus, the display panel is driven in a high frequency driving mode, a low frequency hybrid driving mode and a low frequency driving mode. Therefore, the flicker of the display panel may be prevented.

In addition, the input image of the display panel is divided into a plurality of segments and the driving frequency of the worst segment that has the highest segment driving frequency is decreased. Therefore, the power consumption of the display apparatus may be reduced.

In addition, the shift of the threshold voltage of the switching element may be prevented when the display panel is driven in the low frequency driving mode for a long time. Accordingly, the display defect of the display panel due to the shift of the threshold voltage may be prevented.

Therefore, the display quality deterioration in the low frequency driving mode is prevented so that the power consumption of the display apparatus may be reduced and the display quality of the display panel may be enhanced.

BRIEF EXPLANATION OF THE DRAWINGS

FIG. 20B is a table illustrating a frequency of the compensation frame of FIG. 18 and a number of the compensation frames.

FIG. 20C is a table illustrating a frequency of the compensation frame of FIG. 18 and a number of the compensation frames.

DETAILED DESCRIPTION

Hereinafter, the present inventive concept will be explained in detail with reference to the accompanying drawings.

Figure 1:
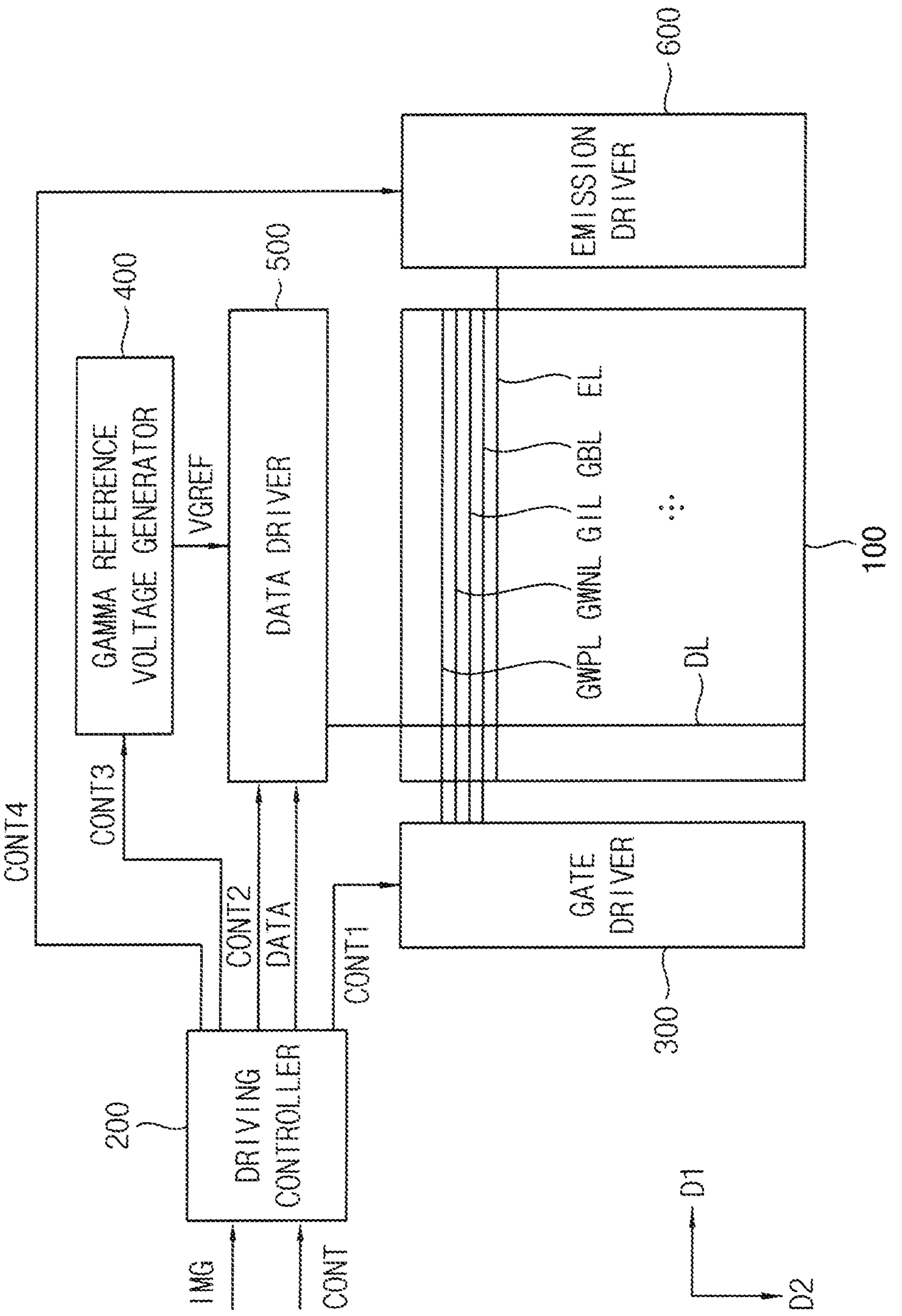
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWPL, GWNL, GIL and GBL, a plurality of data lines DL, a plurality of emission lines EL and a plurality of pixels electrically connected to the gate lines GWPL, GWNL, GIL and GBL, the data lines DL and the emission lines EL. The gate lines GWPL, GWNL, GIL and GBL may extend in a first direction D1, the data lines DL may extend in a second direction D2 crossing the first direction D1, and the emission lines EL may extend in the first direction D1.

The driving controller 200 receives input image data IMG and an input control signal CONT from an external apparatus (not shown). For example, the input image data IMG may include red image data, green image data and blue image data. In another embodiment, the input image data IMG may include white image data. In another embodiment, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 based on the input control signal CONT to control an operation of the gate driver 300, and outputs the first control signal CONT1 to the gate driver 300. The first control signal CONT1 may include a vertical start signal and a gate clock signal.

The driving controller 200 generates the second control signal CONT2 based on the input control signal CONT to control an operation of the data driver 500, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 based on the input control signal CONT to control an operation of the gamma reference voltage generator 400, and outputs the third control signal CONT3 to the gamma reference voltage generator 400.

The driving controller 200 generates the fourth control signal CONT4 based on the input control signal CONT to control an operation of the emission driver 600, and outputs the fourth control signal CONT4 to the emission driver 600.

The gate driver 300 generates gate signals for driving the gate lines GWPL, GWNL, GIL and GBL in response to the first control signal CONT1 received from the driving controller 200. The gate driver 300 may sequentially output the gate signals to the gate lines GWPL, GWNL, GIL and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

Figure 2:
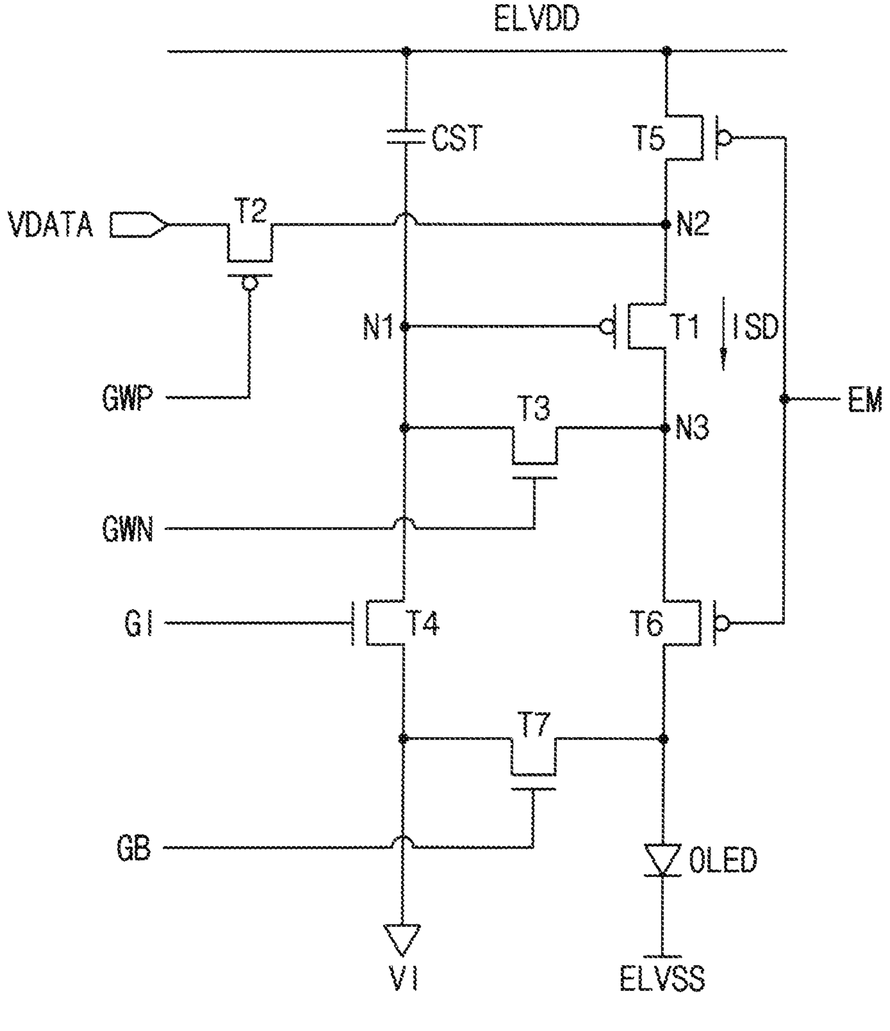
FIG. 2 is a circuit diagram illustrating a pixel of a display panel of FIG. 1.
Figure 3:
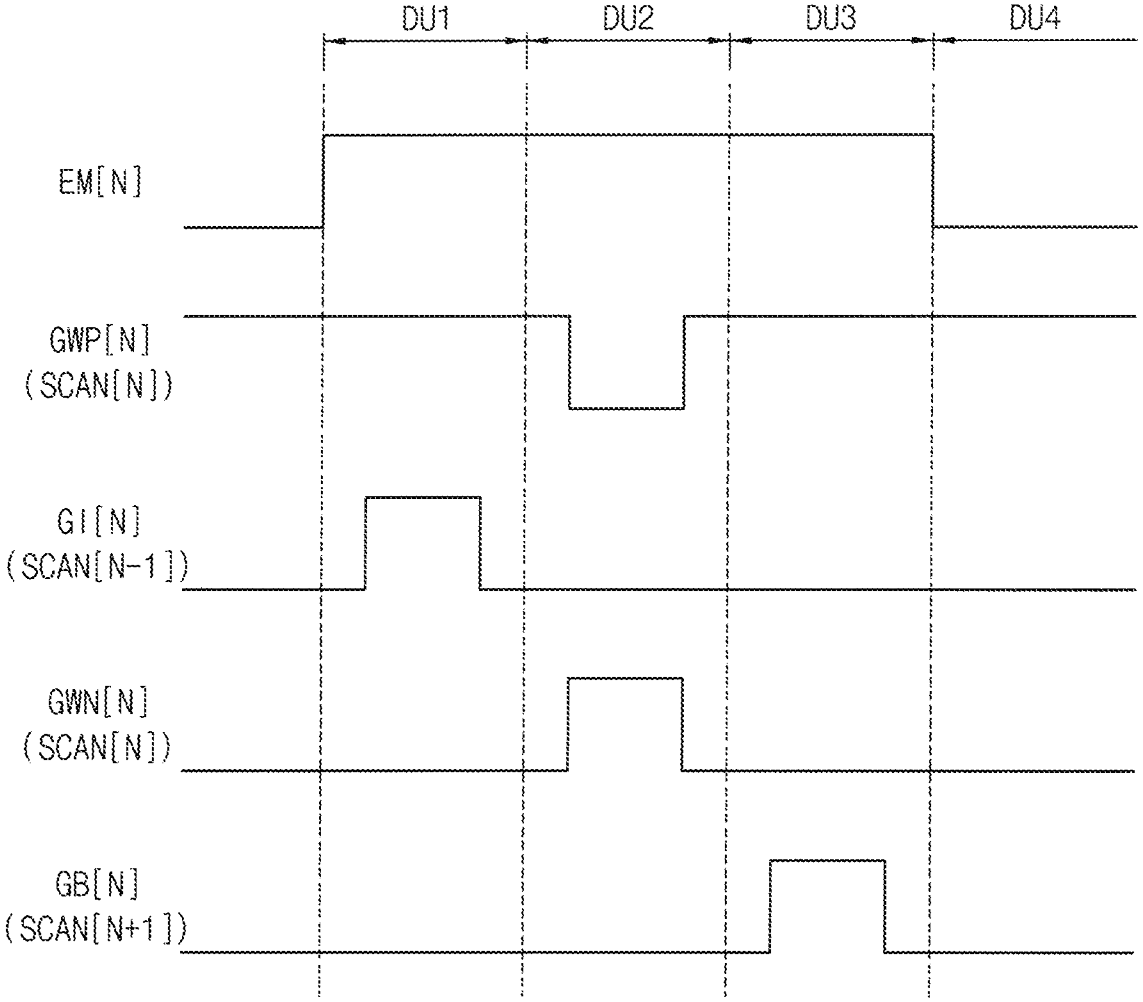
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1 to 3, the display panel 100 includes the plurality of the pixels. Each pixel includes an organic light emitting element OLED.

The pixel receives a data write gate signal GWP and GWN, a data initialization gate signal GI, an organic light emitting element initialization gate signal GB, the data voltage VDATA and the emission signal EM and the organic light emitting element OLED of the pixel emits light corresponding to the level of the data voltage VDATA to display the image.

In the present embodiment, the pixel may include a switching element of a first type and a switching element of a second type different from the first type. For example, the switching element of the first type may be a polysilicon thin film transistor. For example, the switching element of the first type may be a low temperature polysilicon ("LTPS") thin film transistor. For example, the switching element of the second type may be an oxide thin film transistor. For example, the switching element of the first type may be a P-type transistor and the switching element of the second type may be an N-type transistor.

In an embodiment, for example, the data write gate signal may include a first data write gate signal GWP and a second data write gate signal GWN. The first data write gate signal GWP may be applied to the P-type transistor so that the first data write gate signal GWP has an activation signal of a low level corresponding to a data writing timing. The second data write gate signal GWN may be applied to the N-type transistor so that the second data write gate signal GWN has an activation signal of a high level corresponding to the data writing timing.

At least one of the pixels may include first to seventh pixel switching elements T1 to T7, a storage capacitor CST and the organic light emitting element OLED.

The first pixel switching element T1 includes a control electrode connected to a first node N1, an input electrode connected to a second node N2 and an output electrode connected to a third node N3.

In an embodiment, for example, the first pixel switching element T1 may be the polysilicon thin film transistor. For example, the first pixel switching element T1 may be the P-type thin film transistor. The control electrode of the first pixel switching element T1 may be a gate electrode, the input electrode of the first pixel switching element T1 may be a source electrode and the output electrode of the first pixel switching element T1 may be a drain electrode.

The second pixel switching element T2 includes a control electrode to which the first data write gate signal GWP is applied, an input electrode to which the data voltage VDATA is applied and an output electrode connected to the second node N2.

In an embodiment, for example, the second pixel switching element T2 may be the polysilicon thin film transistor. For example, the second pixel switching element T2 may be the P-type thin film transistor. The control electrode of the second pixel switching element T2 may be a gate electrode, the input electrode of the second pixel switching element T2 may be a source electrode and the output electrode of the second pixel switching element T2 may be a drain electrode.

The third pixel switching element T3 includes a control electrode to which the second data write gate signal GWN is applied, an input electrode connected to the first node N1 and an output electrode connected to the third node N3.

In an embodiment, for example, the third pixel switching element T3 may be the oxide thin film transistor. For example, the third pixel switching element T3 may be the N-type thin film transistor. The control electrode of the third pixel switching element T3 may be a gate electrode, the input electrode of the third pixel switching element T3 may be a source electrode and the output electrode of the third pixel switching element T3 may be a drain electrode.

The fourth pixel switching element T4 includes a control electrode to which the data initialization gate signal GI is applied, an input electrode to which an initialization voltage VI is applied and an output electrode connected to the first node N1.

In an embodiment, for example, the fourth pixel switching element T4 may be the oxide thin film transistor. For example, the fourth pixel switching element T4 may be the N-type thin film transistor. The control electrode of the fourth pixel switching element T4 may be a gate electrode, the input electrode of the fourth pixel switching element T4 may be a source electrode and the output electrode of the fourth pixel switching element T4 may be a drain electrode.

The fifth pixel switching element T5 includes a control electrode to which the emission signal EM is applied, an input electrode to which a high power voltage ELVDD is applied and an output electrode connected to the second node N2.

In an embodiment, for example, the fifth pixel switching element T5 may be the polysilicon thin film transistor. For example, the fifth pixel switching element T5 may be the P-type thin film transistor. The control electrode of the fifth pixel switching element T5 may be a gate electrode, the input electrode of the fifth pixel switching element T5 may be a source electrode and the output electrode of the fifth pixel switching element T5 may be a drain electrode.

The sixth pixel switching element T6 includes a control electrode to which the emission signal EM is applied, an input electrode connected to the third node N3 and an output electrode connected to an anode electrode of the organic light emitting element OLED.

In an embodiment, for example, the sixth pixel switching element T6 may be the polysilicon thin film transistor. For example, the sixth pixel switching element T6 may be a P-type thin film transistor. The control electrode of the sixth pixel switching element T6 may be a gate electrode, the input electrode of the sixth pixel switching element T6 may be a source electrode and the output electrode of the sixth pixel switching element T6 may be a drain electrode.

The seventh pixel switching element T7 includes a control electrode to which the organic light emitting element initialization gate signal GB is applied, an input electrode to which the initialization voltage VI is applied and an output electrode connected to the anode electrode of the organic light emitting element OLED.

In an embodiment, for example, the seventh pixel switching element T7 may be the oxide thin film transistor. For example, the seventh pixel switching element T7 may be the N-type thin film transistor. The control electrode of the seventh pixel switching element T7 may be a gate electrode, the input electrode of the seventh pixel switching element T7 may be a source electrode and the output electrode of the seventh pixel switching element T7 may be a drain electrode.

The storage capacitor CST includes a first electrode to which the high power voltage ELVDD is applied and a second electrode connected to the first node N1.

The organic light emitting element OLED includes the anode electrode and a cathode electrode to which a low power voltage ELVSS is applied.

In FIG. 3, during a first duration DU1, the first node N1 and the storage capacitor CST are initialized in response to the data initialization gate signal GI. During a second duration DU2, a threshold voltage |VTH| (See Equation 1 below) of the first pixel switching element T1 is compensated and the data voltage VDATA of which the threshold voltage |VTH| is compensated is written to the first node N1 in response to the first and second data write gate signals GWP and GWN. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

Although an emission off duration of the emission signal EM corresponds to first to third durations DU1, DU2 and DU3 in the present embodiment, the present inventive concept is not limited thereto. In another embodiment, the emission off duration of the emission signal EM may be set to include the data writing duration DU2. The emission off duration of the emission signal EM may be longer than a sum of the first to third durations DU1, DU2 and DU3.

During the first duration DU1, the data initialization gate signal GI may have an active level. For example, the active level of the data initialization gate signal GI may be a high level. When the data initialization gate signal GI has the active level, the fourth pixel switching element T4 is turned on so that the initialization voltage VI may be applied to the first node N1. The data initialization gate signal GI[N] of a present stage may be generated based on a scan signal SCAN[N−1] of a previous stage.

During the second duration DU2, the first data write gate signal GWP and the second data write gate signal GWN may have an active level. For example, the active level of the first data write gate signal GWP may be a low level and the active level of the second data write gate signal GWN may be a high level. When the first data write gate signal GWP and the second data writhe gate signal GWN have the active level, the second pixel switching element T2 and the third pixel switching element T3 are turned on. In addition, the first pixel switching element T1 is turned on in response to the initialization voltage VI. The first data write gate signal GWP[N] of the present stage may be generated based on a scan signal SCAN[N] of the present stage. The second data write gate signal GWN[N] of the present stage may be generated based on the scan signal SCAN[N] of the present stage.

A voltage which is subtraction an absolute value |VTH| of the threshold voltage of the first pixel switching element T1 from the data voltage VDATA may be charged at the first node N1 along a path generated by the first to third pixel switching elements T1, T2 and T3.

During the third duration DU3, the organic light emitting element initialization gate signal GB may have an active level. For example, the active level of the organic light emitting element initialization gate signal GB may be a high level. When the organic light emitting element initialization gate signal GB has the active level, the seventh pixel switching element T7 is turned on so that the initialization voltage VI may be applied to the anode electrode of the organic light emitting element OLED. The organic light emitting element initialization gate signal GB[N] of the present stage may be generated based on a scan signal SCAN[N+1] of a next stage.

During the fourth duration DU4, the emission signal EM may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined as following Equation 1.

$$ISD=\tfrac{1}{2}\mu Cox\,W/L(VSG=|VTH|)^2 \quad \text{[Equation 1]}$$

In Equation 1, μ is a mobility of the first pixel switching element T1. Cox is a capacitance per unit area of the first pixel switching element T1. W/L is a ratio of a width to length of the first pixel switching element T1. VSG is a voltage between the input electrode N2 of the first pixel switching element T1 and the control node N1 of the first pixel switching element T1. |VTH| is the threshold voltage of the first pixel switching element T1.

The voltage VG of the first node N1 after the compensation of the threshold voltage |VTH| during the second duration DU2 may be represented as following Equation 2.

$$VG=V\text{DATA}-|V\text{TH}| \quad \text{[Equation 2]}$$

When the organic light emitting element OLED emits the light during the fourth duration DU4, the driving voltage VOV and the driving current ISD may be represented as following Equations 3 and 4. In Equation 3, VS is a voltage of the second node N2.

$$VOV=VS-VG-|V\text{TH}|=ELVDD-(V\text{DATA}-|V\text{TH}|)-|V\text{TH}|=ELVDD-V\text{DATA} \quad \text{[Equation 3]}$$

$$ISD=\tfrac{1}{2}\mu Cox\,W/L(ELVDD-VDATA)^2 \quad \text{[Equation 1]}$$

The threshold voltage |VTH| is compensated during the second duration DU2, so that the driving current ISD may be determined regardless of the threshold voltage |VTH| of the first pixel switching element T1 when the organic light emitting element OLED emits the light during the fourth duration DU4.

In the present embodiment, when the image displayed on the display panel 100 is a static image or the display panel is operated in always-on mode, a driving frequency of the display panel 100 may be decreased to reduce a power consumption. When all of the switching elements of the pixel of the display panel 100 are polysilicon thin film transistor, a flicker may be generated due to a leakage current of the pixel switching element in the low frequency driving mode. Thus, some of the pixel switching elements may be the oxide thin film transistors. In an embodiment, the third pixel switching element T3, the fourth pixel switching element T4 and the seventh pixel switching element T7 may be the oxide thin film transistors. The first pixel switching element T1, the second pixel switching element T2, the fifth pixel switching element T5 and the sixth pixel switching element T6 may be the polysilicon thin film transistors.

Figure 4:
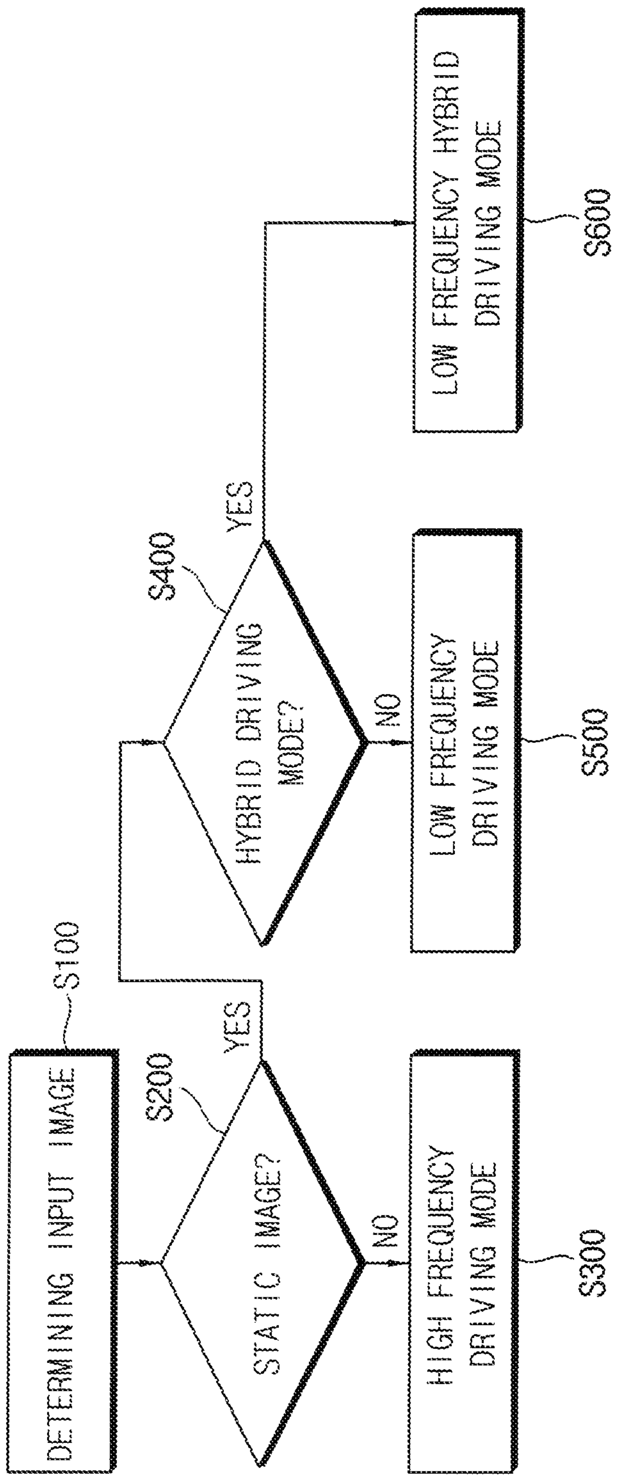
FIG. 4 is a flowchart illustrating a driving mode of the display apparatus of FIG. 1.
Figure 5A:
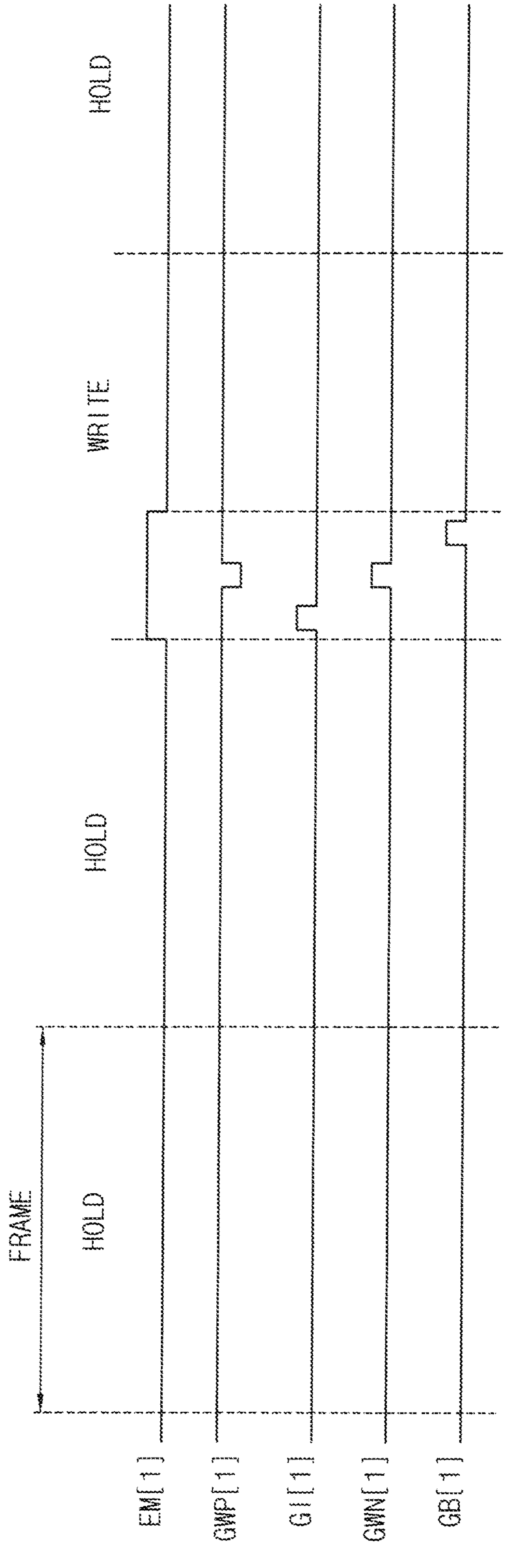
FIG. 5A is a timing diagram illustrating input signals applied to the pixels of the display panel of FIG. 2 in a low frequency driving mode.
Figure 5B:
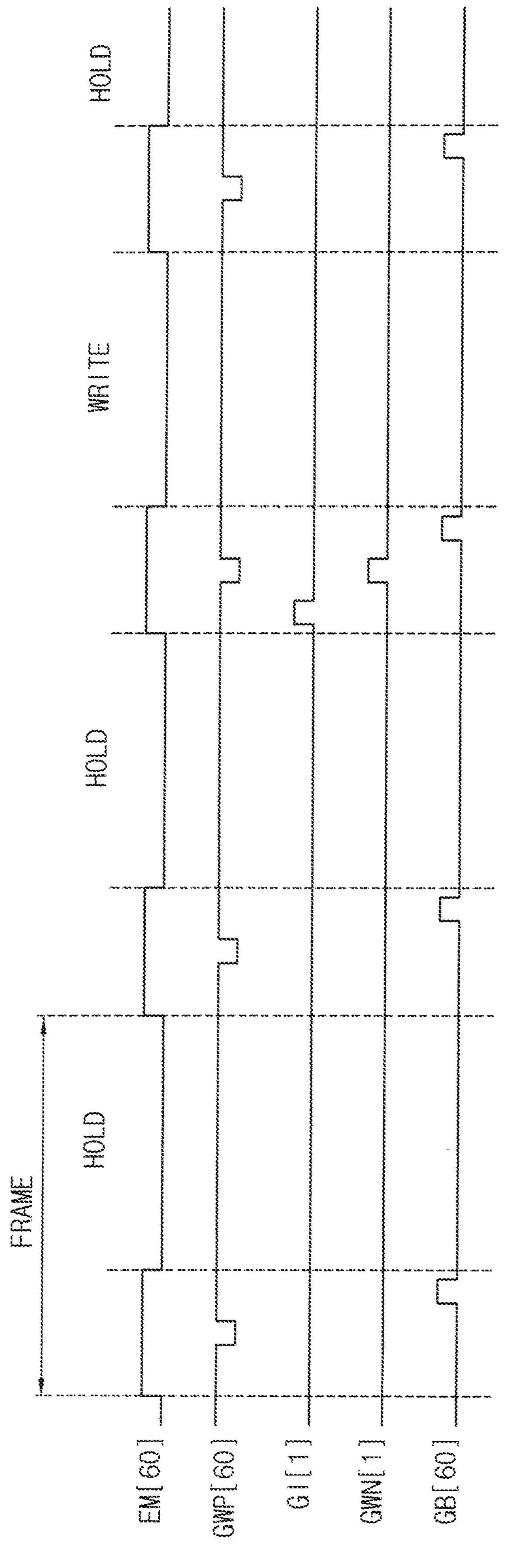
FIG. 5B is a timing diagram illustrating input signals applied to the pixels of the display panel of FIG. 2 in a low frequency hybrid driving mode.

FIG. 4 is a flowchart illustrating a driving mode of the display apparatus of FIG. 1. FIG. 5A is a timing diagram illustrating input signals applied to the pixels of the display panel of FIG. 2 in a low frequency driving mode. FIG. 5B is a timing diagram illustrating input signals applied to the pixels of the display panel of FIG. 2 in a low frequency hybrid driving mode.

Referring to FIGS. 1 to 5B, a driving mode of the display panel 100 includes a first mode, a second mode and a third mode. In the first mode, the display panel driver may drive at least one of switching elements (e.g. T2, T5 and T6) of the first type (e.g., P-type thin film transistor) in a high driving frequency and at least one of switching elements (e.g. T3 and T4) of the second type (e.g., N-type thin film transistor) in the high driving frequency. In the second mode, the display panel driver may drive at least one of switching elements (e.g. T2, T5 and T6) of the first type in the high driving frequency and at least one of switching elements (e.g. T3 and T4) of the second type in a low driving frequency less than the high driving frequency. In the third mode, the display panel driver may drive at least one of switching elements (e.g. T2, T5 and T6) of the first type in the low driving frequency and at least one of switching elements (e.g. T3 and T4) of the second type in the low driving frequency.

However, all of the switching elements of the second type may not be driven in the low driving frequency in the second mode. The switching element (e.g. T7) of the second type may be an element for initializing the organic light emitting element so that the seventh pixel switching element T7 may be driven in the high driving frequency like the fifth pixel switching element T5 and the sixth pixel switching element T6 in the second mode.

The first mode may be the high frequency driving mode. The second mode may be the low frequency hybrid driving mode. The third mode may be the low frequency driving mode.

The display panel driver (e.g. the driving controller 200) analyzes the input image (step S100). The display panel driver determines whether the input image represents a moving image or a static image (step S200).

When the input image represents a moving image, the display panel 100 is driven in the high frequency driving mode (step S300). When the input image represents a static image and the display apparatus is in a hybrid driving mode (step S400), the display panel 100 is driven in the low frequency hybrid driving mode (step S600). When the input image represents a static image and the display apparatus is not in the hybrid driving mode (step S400), the display panel 100 is driven in the low frequency driving mode (step S500).

FIG. 5A illustrates the signals of the low frequency driving mode. In the low frequency driving mode, the emission signal EM, the first data write gate signal GWP, the data initialization gate signal GI, the second data write gate signal GWN and the organic light emitting element initialization gate signal GB may be driven in the low driving frequency.

In FIG. 5A, the high driving frequency may be 60 Hertz (Hz) and the low driving frequency may be 1 Hz. Herein, in the low frequency driving mode, a writing operation WRITE is operated in one frame per a second and holding operations HOLD are operated in fifty nine frames per a second.

FIG. 5B illustrates the signals of the low frequency hybrid driving mode. In the low frequency hybrid driving mode, the emission signal EM, the first data write gate signal GWP and the organic light emitting element initialization gate signal GB may be driven in the high driving frequency and the data initialization gate signal GI and the second data write gate signal GWN may be driven in the low driving frequency.

In FIG. 5B, the high driving frequency may be 60 Hz and the low driving frequency may be 1 Hz. Herein, in the low frequency driving mode, a writing operation WRITE is operated in a frame and holding operations HOLD are operated in fifty nine frames in a second. In the holding operation HOLD, the organic light emitting element may be repetitively turned on and off.

In terms of power consumption reduction, the low frequency driving mode may be better than the low frequency hybrid driving mode, but the flicker may be visually perceived to a user in the low frequency driving mode according to the input image. Thus, the display panel 100 may be selectively driven in the low frequency driving mode and the low frequency hybrid driving mode by activating and deactivating the hybrid driving mode (step S400). For example, the display apparatus may provide a user with a menu or switch so that the user may select activation or deactivation of the hybrid driving mode.

Figure 6:
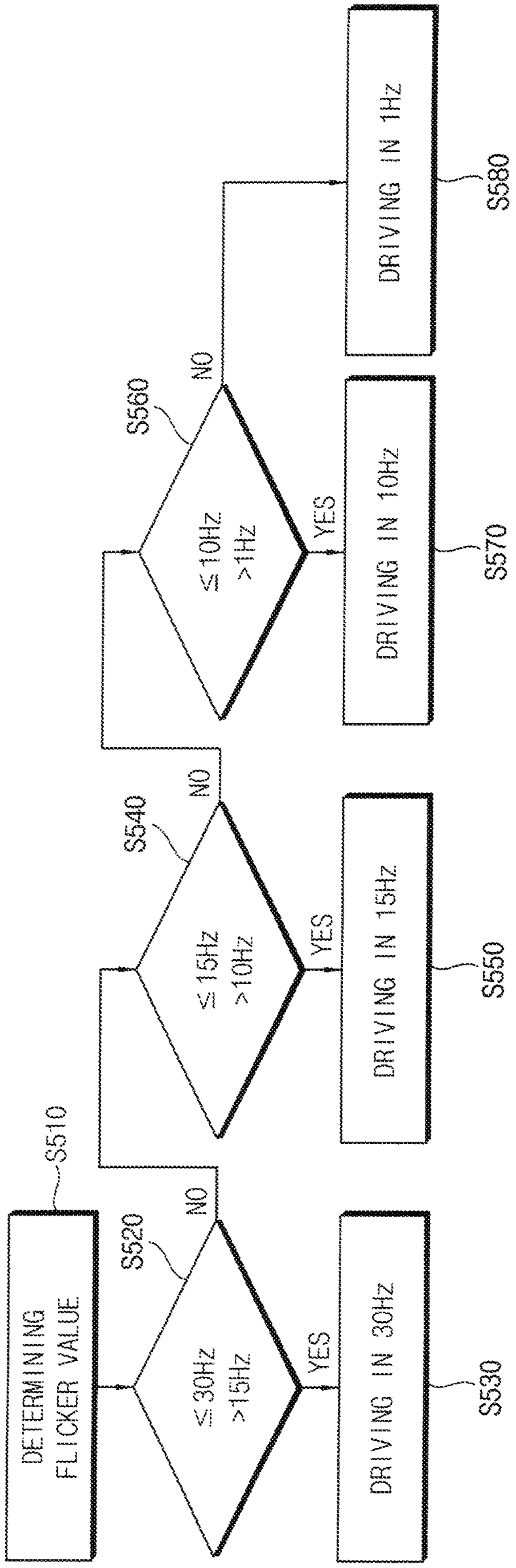
FIG. 6 is a flowchart illustrating a detailed operation of the low frequency driving mode of FIG. 4.

FIG. 6 is a flowchart illustrating a detailed operation of the low frequency driving mode of FIG. 4.

Referring to FIGS. 1 to 6, in the low frequency driving mode, the input image may be analyzed so that a flicker value may be determined (step S510). The flicker value may represent a lowest frequency not generating the flicker of the display image.

When the flicker value is greater than 15 Hz and equal to or less than 30 Hz (step S520), the display panel 100 may be driven in 30 Hz in the low frequency driving mode (step S530).

Although not shown in figures, when the flicker value is greater than 30 Hz, the display panel 100 may be driven in the high frequency driving mode (step S300).

When the flicker value is greater than 10 Hz and equal to or less than 15 Hz (step S540), the display panel 100 may be driven in 15 Hz in the low frequency driving mode (step S550).

When the flicker value is greater than 1 Hz and equal to or less than 10 Hz (step S560), the display panel 100 may be driven in 10 Hz in the low frequency driving mode (step S570).

When the flicker value is equal to or less than 1 Hz, (step S560), the display panel 100 may be driven in 1 Hz in the low frequency driving mode (step S580).

Figure 7:
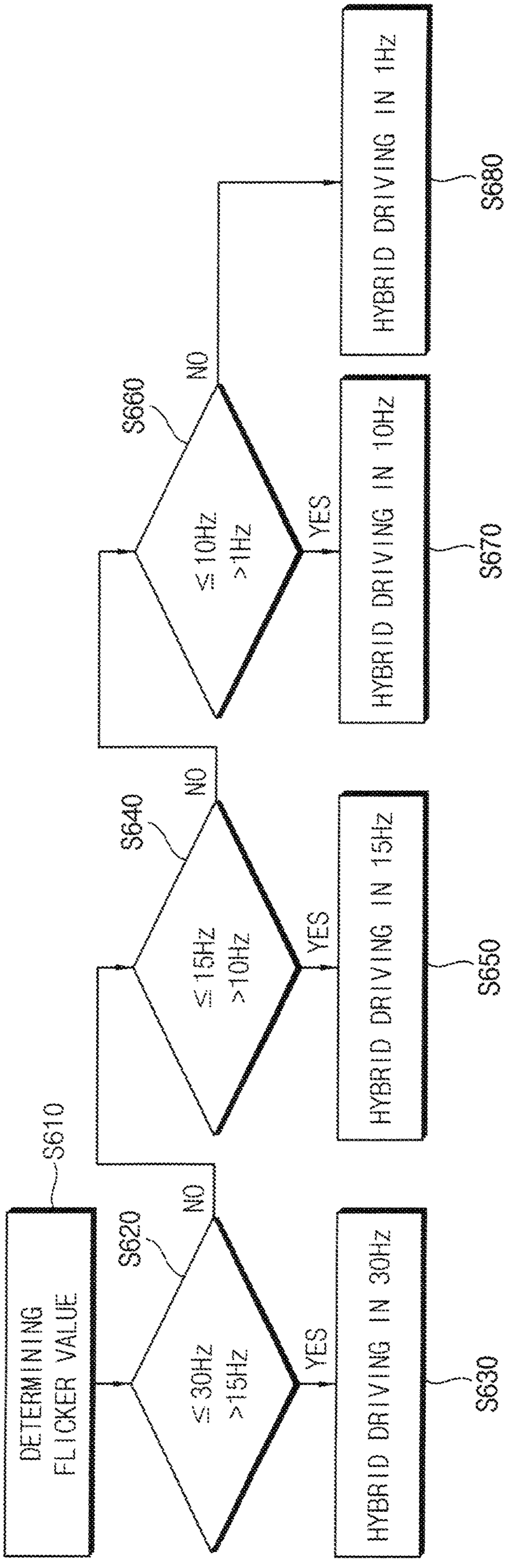
FIG. 7 is a flowchart illustrating an example of a detailed operation of the low frequency hybrid driving mode of FIG. 4.

FIG. 7 is a flowchart illustrating an example of a detailed operation of the low frequency hybrid driving mode of FIG. 4.

Referring to FIGS. 1 to 7, the steps of the operation (step S500) of the low frequency driving mode may be applied to the operation (step S600) of the low frequency hybrid driving mode.

In the low frequency hybrid driving mode, the input image may be analyzed so that a flicker value may be determined (step S610).

When the flicker value is greater than 15 Hz and equal to or less than 30 Hz (step S620), the display panel 100 may be driven in 30 Hz in the low frequency hybrid driving mode (step S630).

Although not shown in figures, when the flicker value is greater than 30 Hz, the display panel 100 may be driven in the high frequency driving mode (step S300).

When the flicker value is greater than 10 Hz and equal to or less than 15 Hz (step S640), the display panel 100 may be driven in 15 Hz in the low frequency hybrid driving mode (step S650).

When the flicker value is greater than 1 Hz and equal to or less than 10 Hz (step S660), the display panel 100 may be driven in 10 Hz in the low frequency hybrid driving mode (step S670).

When the flicker value is equal to or less than 1 Hz, (step S660), the display panel 100 may be driven in 1 Hz in the low frequency hybrid driving mode (step S680).

According to the present embodiment, the display panel 100 is driven in the high frequency driving mode, the low frequency hybrid driving mode and the low frequency driving mode so that the power consumption of the display apparatus may be reduced and the flicker of the display panel may be effectively prevented.

Figure 8A:
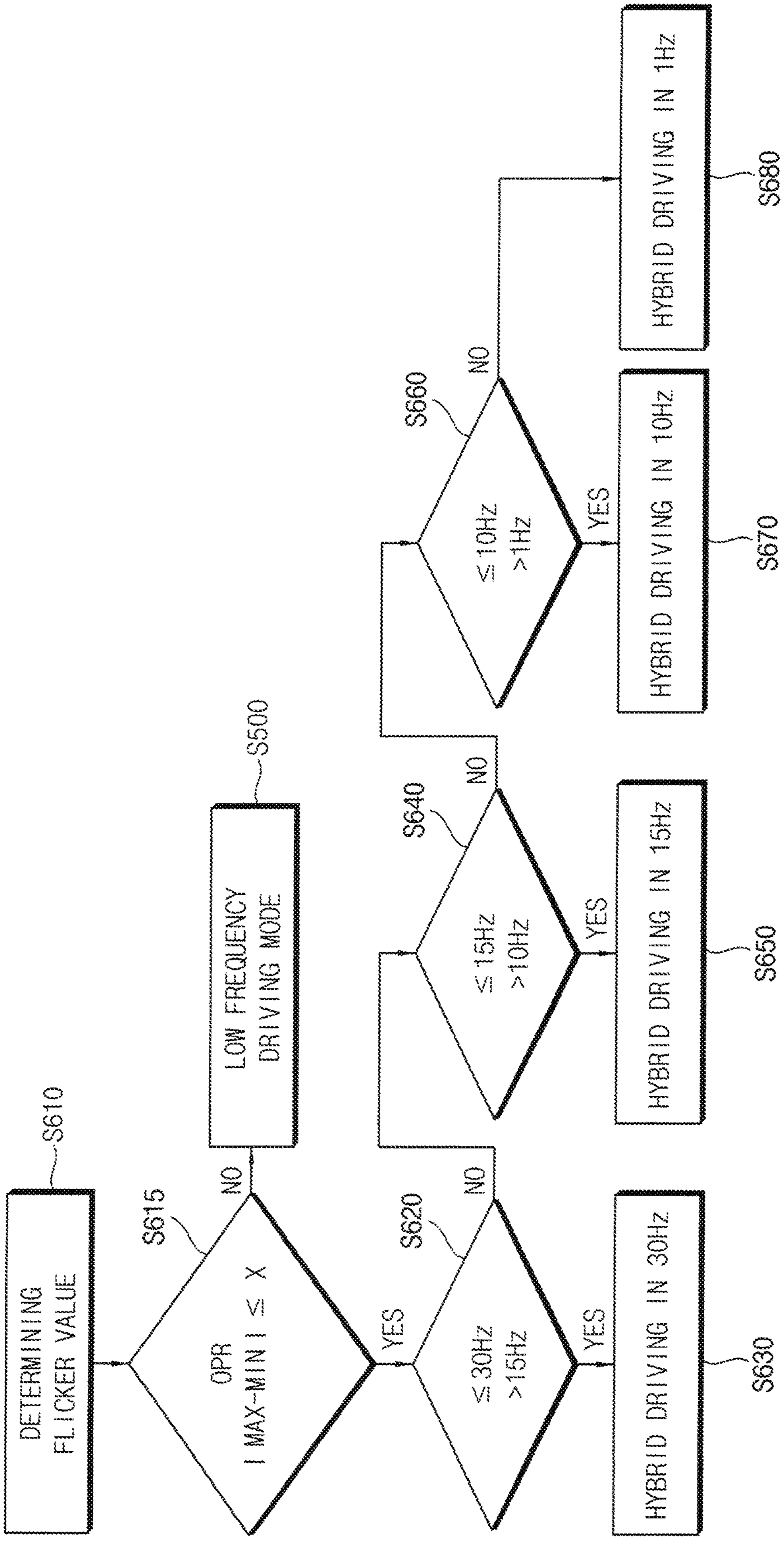
FIGS. 8A and 8B are flowcharts illustrating examples of a detailed operation of a low frequency hybrid driving mode according to an embodiment of the present inventive concept.
Figure 8B:
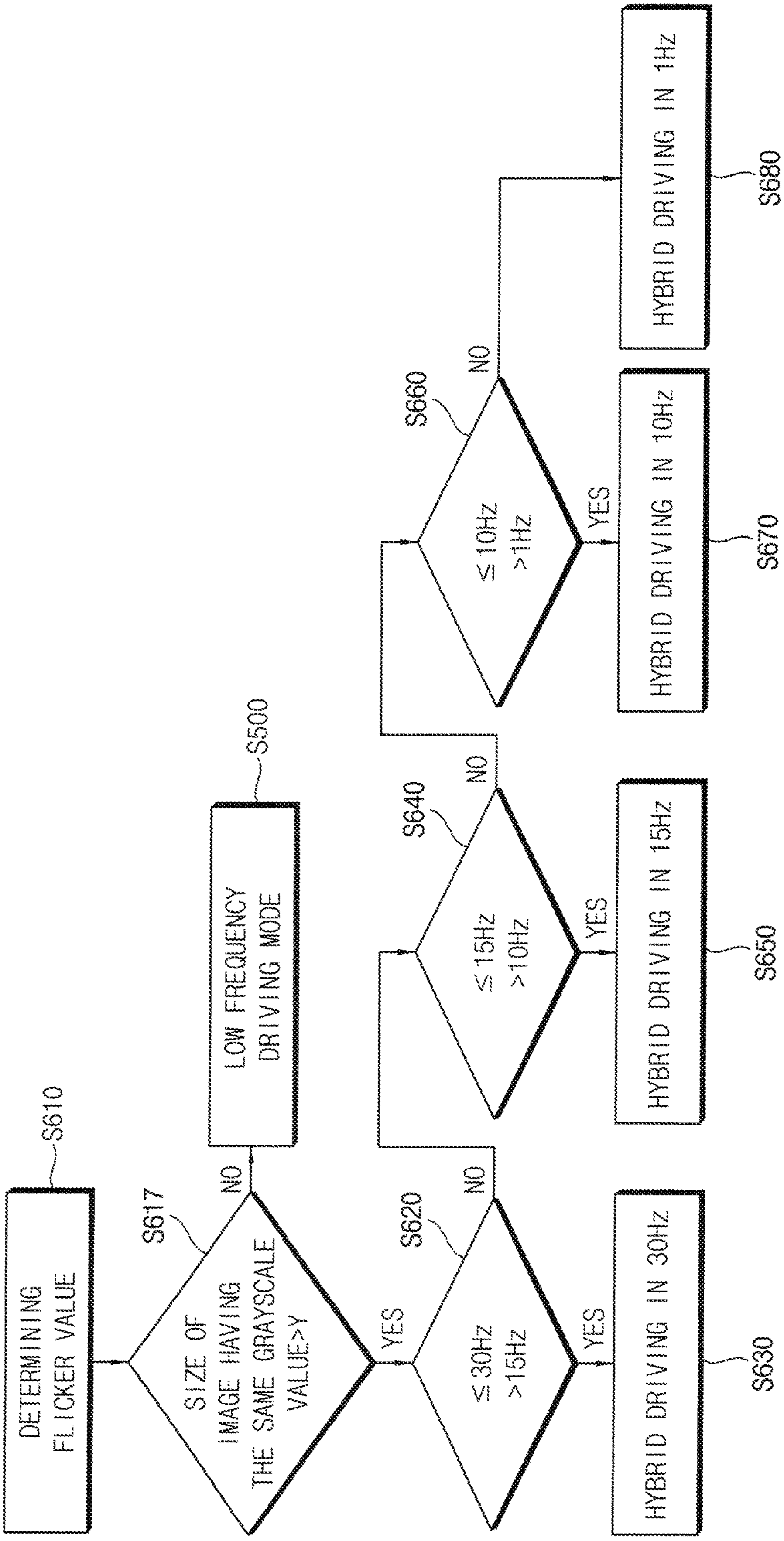

FIGS. 8A and B are flowchart illustrating examples of a detailed operation of a low frequency hybrid driving mode according to an embodiment of the present inventive concept.

The display apparatus according to the present embodiment is substantially the same as the display apparatus of the previous embodiment explained referring to FIGS. 1 to 7 except for the operation of the low frequency hybrid driving mode. Thus, the same reference numerals will be used to refer to the same or like parts as those described in the previous embodiment of FIGS. 1 to 7 and any repetitive explanation concerning the above elements will be omitted.

Referring to FIGS. 1 to 6 and 8A, in the low frequency hybrid driving mode, the input image may be analyzed so that a flicker value may be determined (step S610).

When a difference OPR|MAX−MIN| between a maximum luminance of the input image and a minimum luminance of the input image is equal to or less than a first reference value X (step S615), the display panel driver may drive the display panel 100 in the low frequency hybrid driving mode (steps S620 to S680).

In contrast, when the difference OPR|MAX−MIN| between the maximum luminance of the input image and the minimum luminance of the input image is greater than the first reference value X (step S615), the display panel driver may drive the display panel 100 in the low frequency driving mode (step S500).

When the difference OPR|MAX−MIN| between the maximum luminance of the input image and the minimum luminance of the input image is great enough, a possibility of a generation of the flicker may be relatively low. Therefore, the display panel 100 may be driven in the low frequency driving mode to reduce the power consumption with relatively low possibility of flicker.

In contrast, when the difference OPR|MAX−MIN| between the maximum luminance of the input image and the minimum luminance of the input image is not great enough, the possibility of the generation of the flicker may be relatively high so that the display panel 100 may be driven in the low frequency hybrid driving mode to prevent the flicker.

Referring to FIGS. 1 to 6 and 8B, when a size of an image having the same grayscale value is greater than a second reference value Y (step S617), the display panel driver may drive the display panel 100 in the low frequency hybrid driving mode (steps S620 to S680).

In contrast, when the size of the image having the same grayscale value is equal to or less than the second reference value Y (step S617), the display panel driver may drive the display panel 100 in the low frequency driving mode (step S500).

When the size of the image having the same grayscale value is little, a possibility of a generation of the flicker may be relatively low so that the display panel 100 may be driven in the low frequency driving mode to reduce the power consumption.

In contrast, when the size of the image having the same grayscale value is great, the possibility of the generation of the flicker may be relatively high so that the display panel 100 may be driven in the low frequency hybrid driving mode to prevent the flicker.

According to the present embodiment, the display panel 100 is driven in the high frequency driving mode, the low frequency hybrid driving mode and the low frequency driving mode so that the power consumption of the display apparatus may be reduced and the flicker of the display panel may be effectively prevented.

Figure 9:
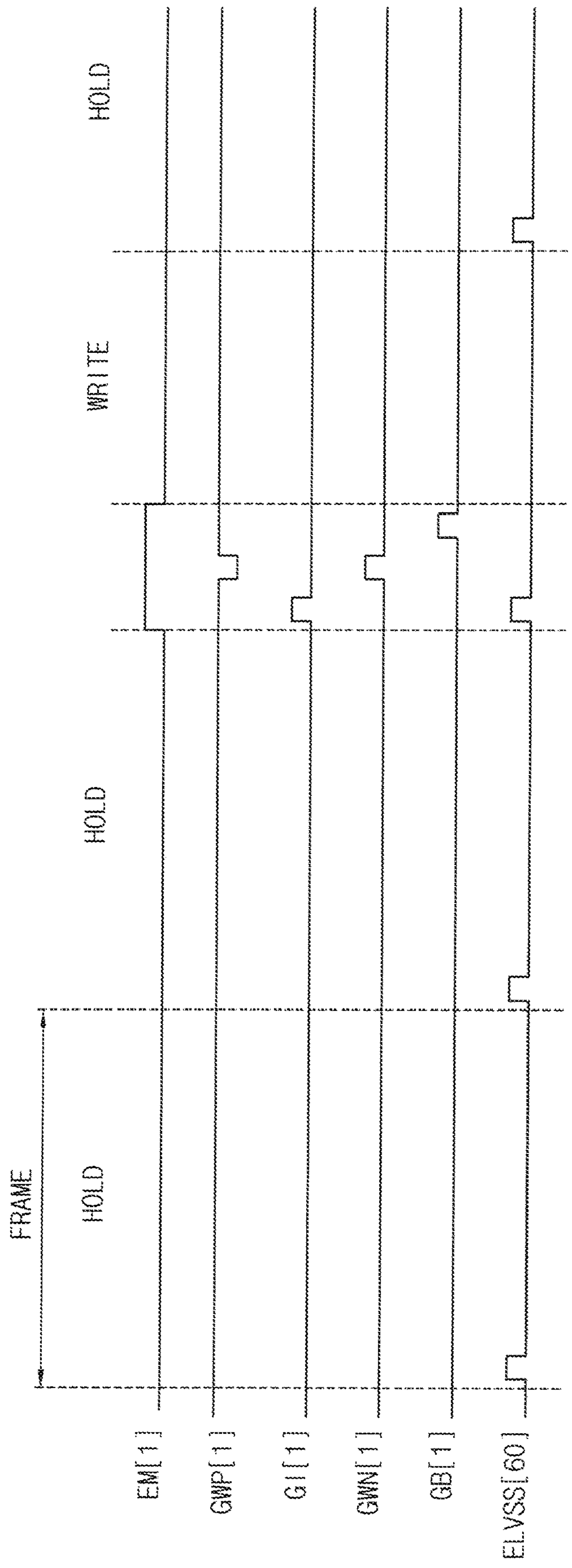
FIG. 9 is a timing diagram illustrating input signals applied to pixels of a display panel according to an embodiment of the present inventive concept.

FIG. 9 is a timing diagram illustrating input signals applied to pixels of a display panel according to an embodiment of the present inventive concept.

The display apparatus according to the present embodiment is substantially the same as the display apparatus of the previous embodiment explained referring to FIGS. 1 to 7 except for the operation of the low frequency hybrid driving mode. Thus, the same reference numerals will be used to refer to the same or like parts as those described in the previous embodiment of FIGS. 1 to 7 and any repetitive explanation concerning the above elements will be omitted.

Referring to FIGS. 1 to 5A, 6, 7 and 9, in the low frequency hybrid driving mode, the emission signal EM, the first data write gate signal GWP, the data initialization gate signal GI, the second data write gate signal GWN and the organic light emitting element initialization gate signal GB may be driven in the low driving frequency.

In contrast, a low power voltage ELVSS applied to a cathode electrode of the organic light emitting element OLED of the display panel 100 may have the high driving frequency. For example, the low power voltage ELVSS may normally maintain a low level and the low power voltage ELVSS may have a high level pulse in the high driving frequency. When the low power voltage ELVSS has the high level pulse, the organic light emitting element OLED may be turned off in a moment so that the organic light emitting element OLED may be turned off in the high driving frequency like FIG. 5B. Accordingly, the flicker of the display panel 100 may be prevented.

Figure 10:
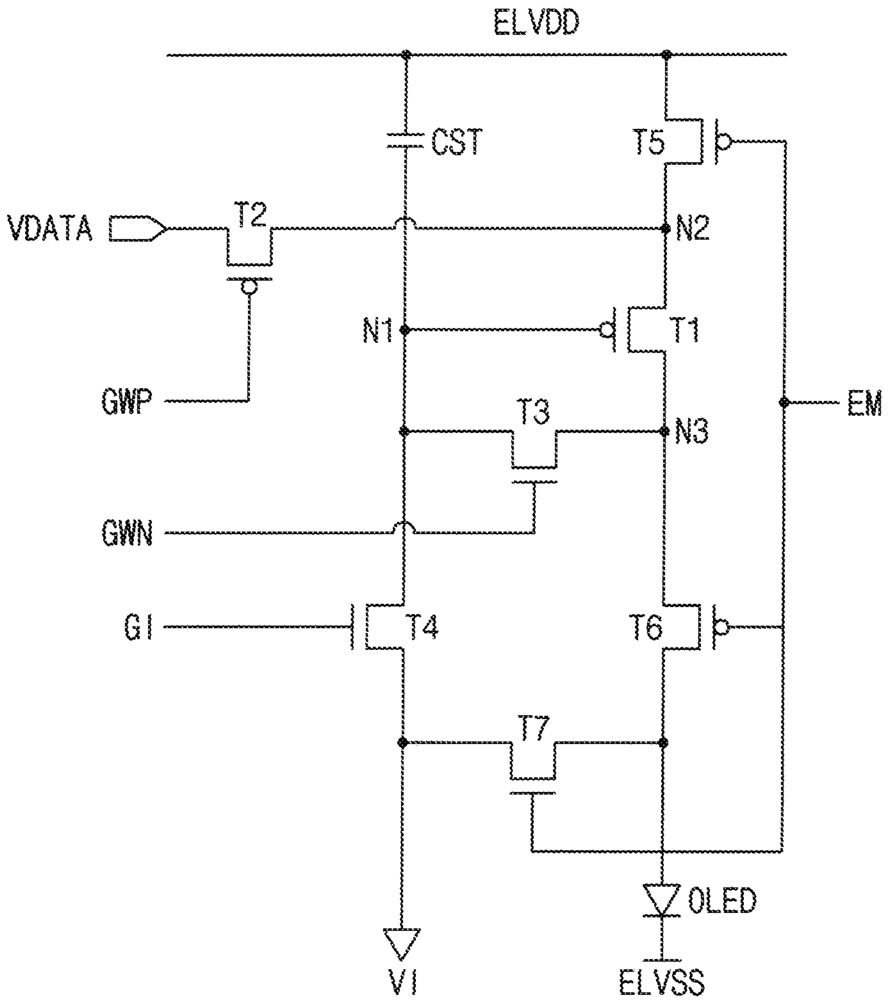
FIG. 10 is a circuit diagram illustrating a pixel of a display panel according to another embodiment of the present inventive concept.

FIG. 10 is a circuit diagram illustrating a pixel of a display panel according to another embodiment of the present inventive concept.

The display apparatus according to the present embodiment is substantially the same as the display apparatus of the previous embodiment explained referring to FIGS. 1 to 7 except for the pixel structure of the display panel. Thus, the same reference numerals will be used to refer to the same or like parts as those described in the previous embodiment of FIGS. 1 to 7 and any repetitive explanation concerning the above elements will be omitted.

Referring to FIGS. 1, 3 to 7 and 10, at least one of the pixels may include first to seventh pixel switching elements T1 to T7, a storage capacitor CST and the organic light emitting element OLED.

The pixel structure of the present embodiment is substantially the same as the pixel structure of the previous embodiment of FIG. 2 except that the control electrode of the seventh pixel switching element T7 is connected to the control electrode of the sixth pixel switching element T6.

The emission signal EM is applied to the control electrode of the seventh pixel switching element T7 and the seventh pixel switching element T7 is N-type transistor. Thus, during the high duration (DU1 to DU3 in FIG. 3) of the emission signal EM, the seventh pixel switching element T7 is turned on and the organic light emitting element OLED is initialized.

Figure 11:
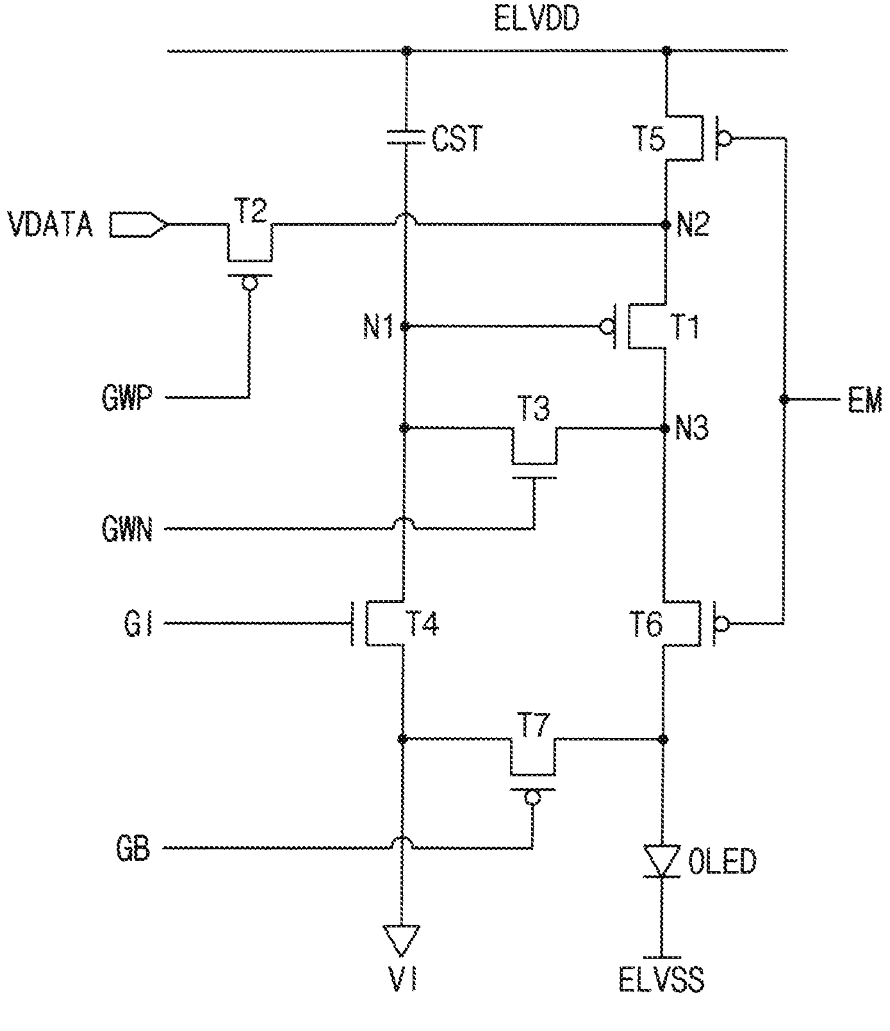
FIG. 11 is a circuit diagram illustrating a pixel of a display panel according to still another embodiment of the present inventive concept.
Figure 12:
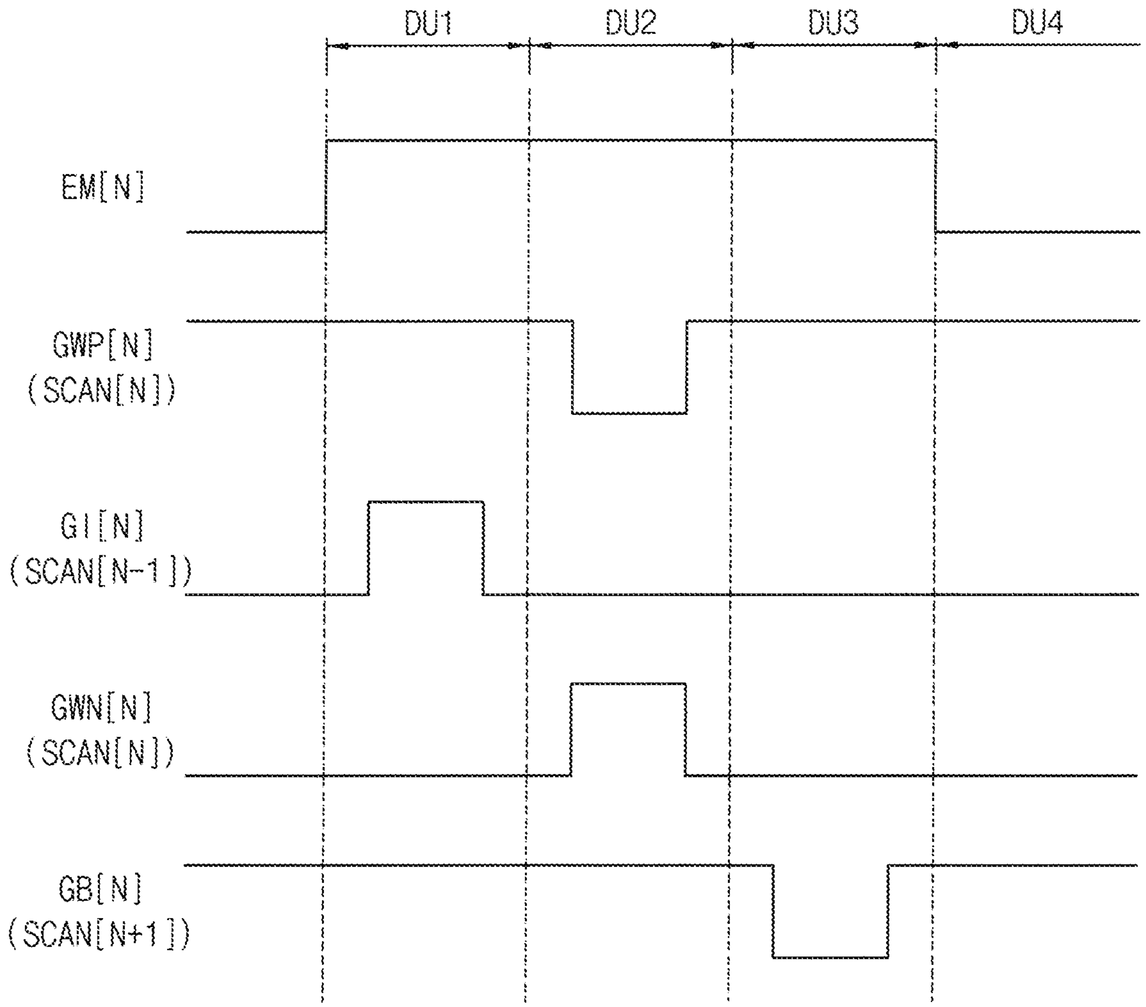
FIG. 12 is a timing diagram illustrating input signals applied to the pixels of FIG. 11.

FIG. 11 is a circuit diagram illustrating a pixel of a display panel according to still another embodiment of the present inventive concept. FIG. 12 is a timing diagram illustrating input signals applied to the pixels of FIG. 11.

The display apparatus according to the present embodiment is substantially the same as the display apparatus of the previous embodiment explained referring to FIGS. 1 to 7 except for the pixel structure of the display panel. Thus, the same reference numerals will be used to refer to the same or like parts as those described in the previous embodiment of FIGS. 1 to 7 and any repetitive explanation concerning the above elements will be omitted.

Referring to FIGS. 1, 3 to 7, 11 and 12, at least one of the pixels may include first to seventh pixel switching elements T1 to T7, a storage capacitor CST and the organic light emitting element OLED.

In the present embodiment, the seventh pixel switching element T7 includes a control electrode to which the organic light emitting element initialization gate signal GB is applied, an input electrode to which the initialization voltage VI is applied and an output electrode connected to the anode electrode of the organic light emitting element OLED.

In an embodiment, for example, the seventh pixel switching element T7 may be the polysilicon thin film transistor. For example, the seventh pixel switching element T7 may be the P-type thin film transistor.

In FIG. 12, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the first and second data write gate signals GWP and GWN. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

In the present embodiment, an active level of the organic light emitting element initialization gate signal GB may be a low level.

In the present embodiment, some of the pixel switching elements may be the oxide thin film transistors. In the present embodiment, the third pixel switching element T3 and the fourth pixel switching element T4 may be the oxide thin film transistors. The first pixel switching element T1, the second pixel switching element T2, the fifth pixel switching element T5, the sixth pixel switching element T6, and the seventh pixel switching element T7 may be the polysilicon thin film transistors.

Figure 13:
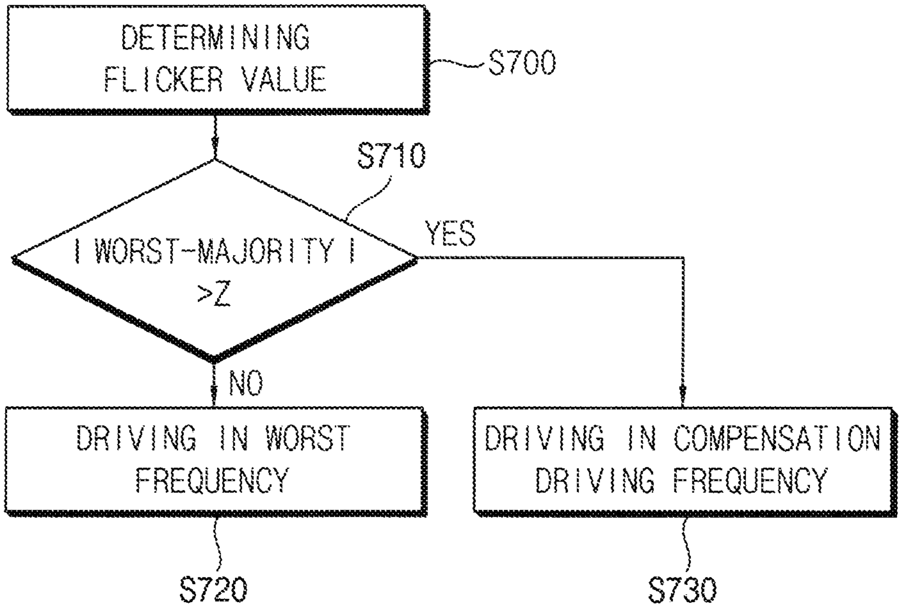
FIG. 13 is a flowchart illustrating an operation of a low frequency driving mode according to another embodiment of the present inventive concept.
Figure 14:
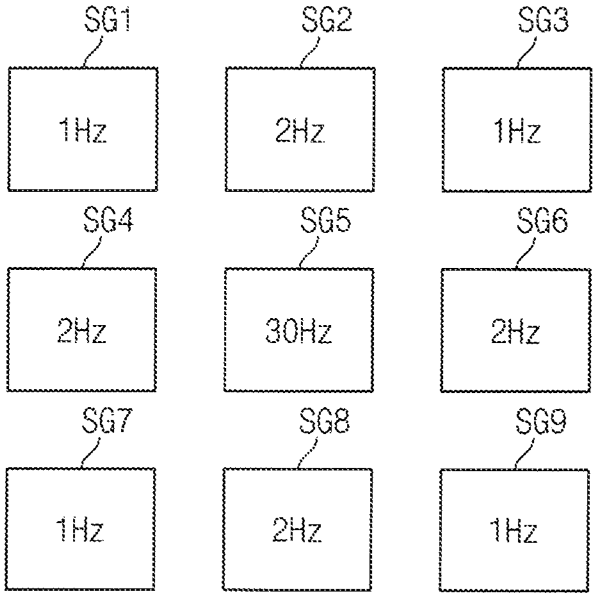
FIG. 14 is a conceptual diagram illustrating segment driving frequencies of input image of the display panel of FIG. 13.
Figure 15:
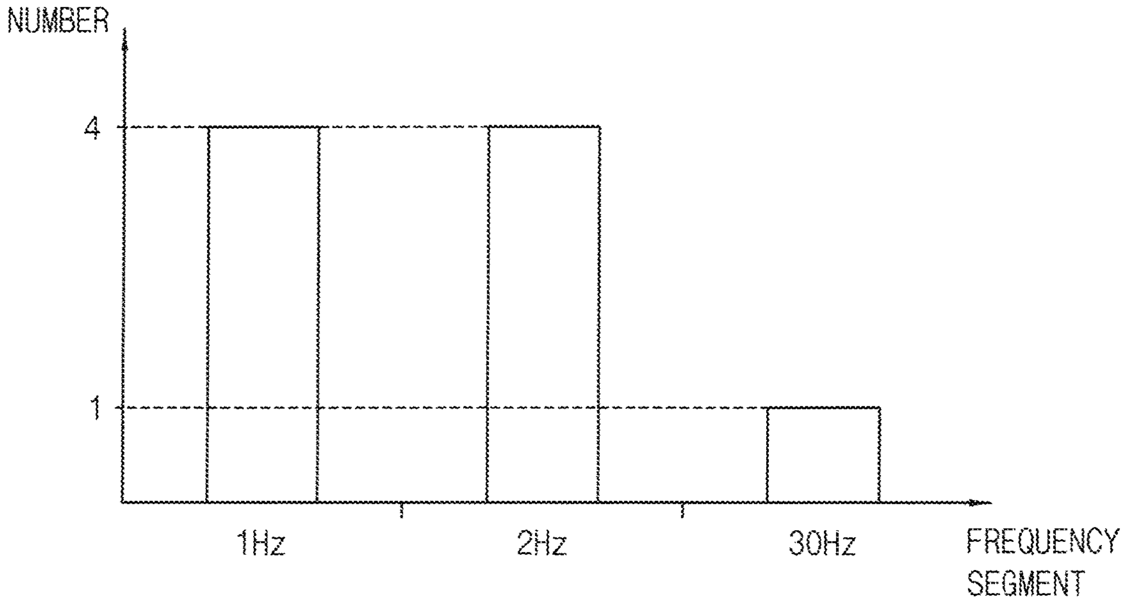
FIG. 15 is a graph illustrating the segment driving frequencies of the input image of the display panel of FIG. 13.

FIG. 13 is a flowchart illustrating an operation of a low frequency driving mode according to another embodiment of the present inventive concept. FIG. 14 is a conceptual diagram illustrating segment driving frequencies of input image of the display panel of FIG. 13. FIG. 15 is a graph illustrating the segment driving frequencies of the input image of the display panel of FIG. 13.

The display apparatus according to the present embodiment is substantially the same as the display apparatus of the previous embodiment explained referring to FIGS. 1 to 7 except for the operation of the low frequency driving mode. Thus, the same reference numerals will be used to refer to the same or like parts as those described in the previous embodiment of FIGS. 1 to 7 and any repetitive explanation concerning the above elements will be omitted.

Alternatively, the operation of the low frequency driving mode of the display apparatus of the present embodiment may be additionally applied to the embodiments explained above.

Referring to FIGS. 1 to 5B and 13 to 15, the display panel driver may divide the input image into a plurality of segments SG1 to SG9. The display panel driver may determine segment flicker values for the segments (step S700). The display panel driver may determine segment driving frequencies for the segments based on the determined segment flicker values.

The display panel driver may determine a worst segment that has a highest segment driving frequency among the segments. In addition, the display panel driver may determine a majority segment that has a most frequent segment driving frequency among the segments.

In FIG. 14, for example, the worst segment may be a fifth segment SG5 having the highest segment driving frequency of 30 Hz. The number of the segments having the segment driving frequency of 1 Hz is four, and the number of the segments having the segment driving frequency of 2 Hz is four. Therefore, the majority segment may be one of the segments having the segment driving frequency of 1 Hz and the segments having the segment driving frequency of 2 Hz.

The display panel driver may calculate an absolute value of a difference between the number of the worst segments and the number of the majority segments. In the example of FIGS. 14 and 15, the number of the worst segments may be one and the number of the majority segments may be four. Therefore, the absolute value of the difference between the number of the worst segments and the number of the majority segments may be three.

When the absolute value of the difference between the number of the worst segments and the number of the majority segments is greater than a third reference value Z (step S710), the display panel driver may drive the display panel 100 in a compensation driving frequency (e.g. 10 Hz) less than the segment driving frequency (e.g. 30 Hz) of the worst segment (step S730).

When the absolute value of the difference between the number of the worst segments and the number of the majority segments is great, the ratio of the worst segment to all the segments may be little. In this case, if the entire display panel 100 is driven in the segment driving frequency of the worst segment, the power consumption may be high.

Thus, as explained above, when the ratio of the worst segment to all the segments is little, the display panel 100 may be driven in the compensation driving frequency less than the segment driving frequency of the worst segment such that the power consumption may be reduced while taking a risk of deteriorating the display quality of the worst segment.

In contrast, when the absolute value of the difference between the number of the worst segments and the number of the majority segments is equal to or less than the third reference value Z (step S710), the display panel driver may drive the display panel 100 in the segment driving frequency (e.g. 30 Hz) of the worst segment (step S720).

When the absolute value of the difference between the number of the worst segments and the number of the majority segments is little, the ratio of the worst segment to all the segments may be great. In this case, the display panel 100 may be driven in the segment driving frequency of the worst segment to prevent deterioration of the display quality.

Figure 16:
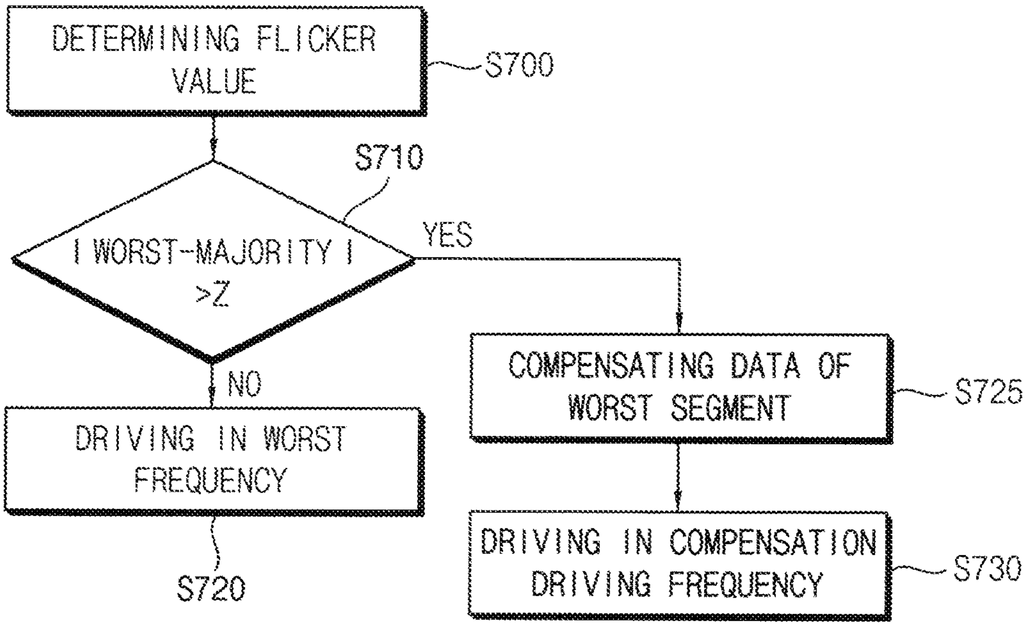
FIG. 16 is a flowchart illustrating an operation of a low frequency driving mode according to still another embodiment of the present inventive concept.

FIG. 16 is a flowchart illustrating an operation of a low frequency driving mode according to still another embodiment of the present inventive concept.

The display apparatus according to the present embodiment is substantially the same as the display apparatus of the previous embodiment explained referring to FIGS. 13 to 15 except for the operation of the low frequency driving mode. Thus, the same reference numerals will be used to refer to the same or like parts as those described in the previous embodiment of FIGS. 13 to 15 and any repetitive explanation concerning the above elements will be omitted.

Referring to FIGS. 1 to 5B and 14 to 16, the display panel driver may divide the input image into a plurality of segments SG1 to SG9. The display panel driver may determine segment flicker values for the segments (step S700). The display panel driver may determine segment driving frequencies for the segments based on the determined segment flicker values.

When the absolute value of the difference between the number of the worst segments and the number of the majority segments is greater than a third reference value Z (step S710), the display panel driver may drive the display panel 100 in a compensation driving frequency (e.g. 10 Hz) less than the segment driving frequency (e.g. 30 Hz) of the worst segment (step S730).

In addition, when the absolute value of the difference between the number of the worst segments and the number of the majority segments is greater than the third reference value Z (step S710), the display panel driver may compensate the data of the worst segment (step S725).

When the display panel 100 is driven in the compensation driving frequency (e.g. 10 Hz) less than the segment driving frequency (e.g. 30 Hz) of the worst segment, a flicker may be generated at the worst segment. Thus, the data of the worst segment may be compensated to prevent the flicker. For example, when a grayscale level of the data of the worst segment may be increased so that the flicker may not be easily recognized by the user. In this case, interpolation may be applied to the worst segment and segments adjacent to the worst segment so that the data compensation of the worst segment may not be easily recognized by the user.

When the absolute value of the difference between the number of the worst segments and the number of the majority segments is equal to or less than the third reference value Z (step S710), the display panel driver may drive the display panel 100 in the segment driving frequency (e.g. 30 Hz) of the worst segment (step S720).

Figure 17:
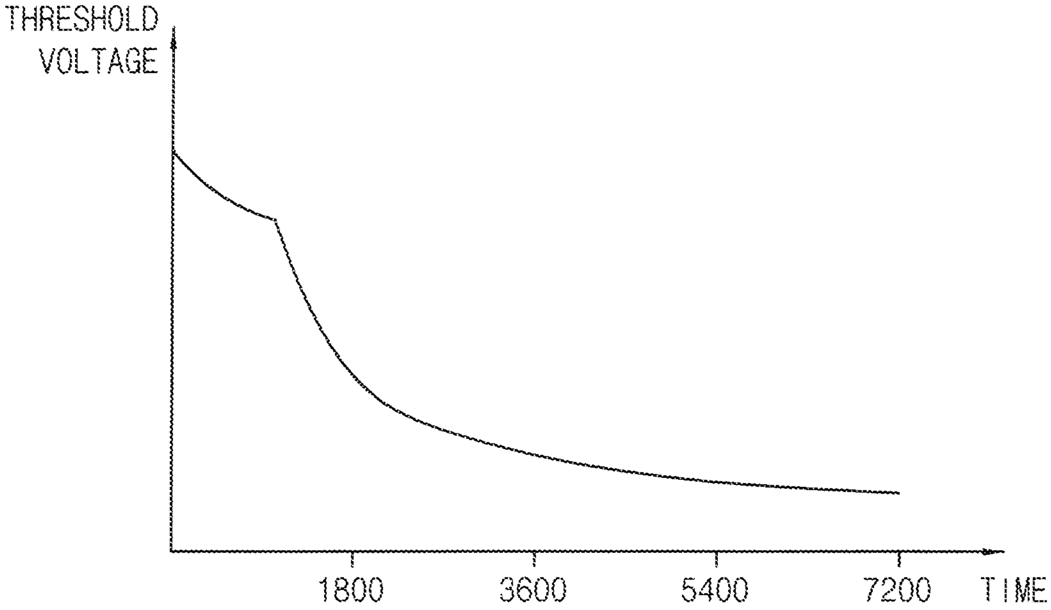
FIG. 17 is a graph illustrating a threshold voltage of a switching element of a display panel according to an embodiment of the present inventive concept according to time.
Figure 18:
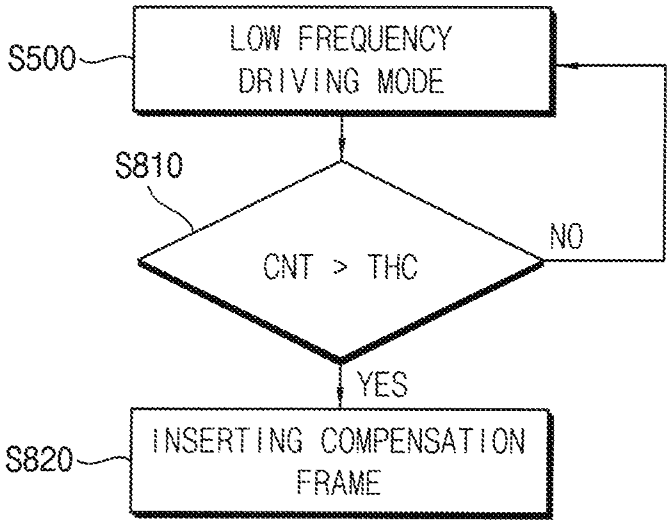
FIG. 18 is a flowchart illustrating an operation of the display panel of FIG. 17 in a low frequency driving mode.
Figures 19, 20A:
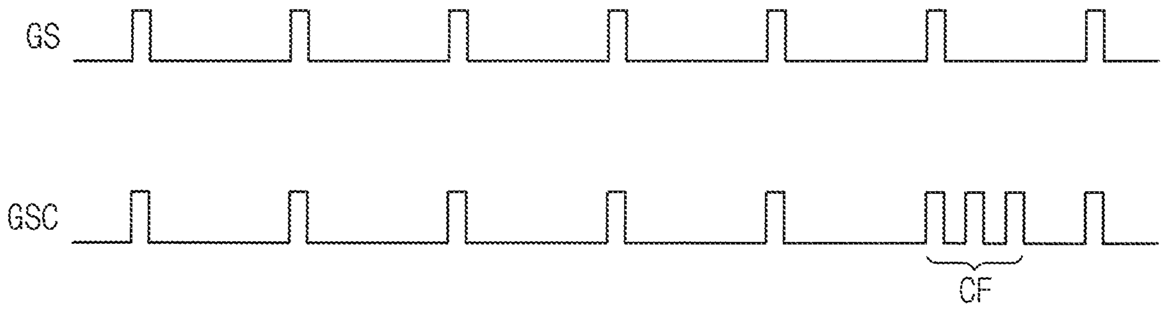
FIG. 19 is a timing diagram illustrating a gate signal and a compensated gate signal applied to the display panel of FIG. 17.
FIG. 20A is a table illustrating a frequency of a compensation frame of FIG. 18 and a number of the compensation frames.

FIG. 17 is a graph illustrating a threshold voltage of a switching element of a display panel according to an embodiment of the present inventive concept according to time. FIG. 18 is a flowchart illustrating an operation of the display panel of FIG. 17 in a low frequency driving mode. FIG. 19 is a timing diagram illustrating a gate signal and a compensated gate signal applied to the display panel of FIG. 17. FIG. 20A is a table illustrating a frequency of a compensation frame of FIG. 18 and a number of the compensation frames. FIG. 20B is a table illustrating a frequency of the compensation frame of FIG. 18 and a number of the compensation frames. FIG. 20C is a table illustrating a frequency of the compensation frame of FIG. 18 and a number of the compensation frames.

The display apparatus according to the present embodiment is substantially the same as the display apparatus of the previous embodiment explained referring to FIGS. 1 to 7 except that the threshold voltage of the switching element is compensated in the low frequency driving mode. Thus, the same reference numerals will be used to refer to the same or like parts as those described in the previous embodiment of FIGS. 1 to 7 and any repetitive explanation concerning the above elements will be omitted.

Alternatively, the operation of the low frequency driving mode of the display apparatus of the present embodiment may be additionally applied to the embodiments explained above.

Referring to FIGS. 1 to 5B and 17 to 20C, the threshold voltage of the switching element of the pixels of the display panel 100 may be shifted in a negative direction as a duration of the low frequency driving increases.

In an embodiment, for example, the shift of the threshold voltage may be generated at the third pixel switching element T3, the fourth pixel switching element T4 and the seventh pixel switching element T7 which are oxide thin film transistor. When the threshold voltage is shifted, the display defect such as a horizontal line defect may be generated on the display panel 100.

When the display panel 100 is operated in the low frequency driving mode (step S500), the display panel driver may count a duration CNT of the low frequency driving mode.

When the duration CNT of the low frequency driving mode is greater than a reference time THC (step S810), a driving signal applied to at least one of the switching element of the first type (e.g. the polysilicon thin film transistor) and the switching element of the second type (e.g. the oxide thin film transistor) may be adjusted (or changed) to prevent the shift of the threshold voltage.

In the present embodiment, when the duration CNT of the low frequency driving mode is greater than the reference time THC (step S810), the display panel driver may insert a compensation frame CF having a compensation driving frequency greater than the low driving frequency (step S820).

In an embodiment, for example, after inserting the compensation frame CF, the duration CNT of the low frequency driving mode may be initialized.

In FIG. 19, the driving signal GS may be the gate signal which is not compensated, the compensated driving signal GSC may be the gate signal including the inserted compensation frame CF to compensate the threshold voltage. The compensated driving signal GSC may be at least one of the signals EM, GWP, GI, GWN and GB having the low driving frequency in FIG. 5A.

In FIG. 20A, for example, the reference time THC and the compensation frame frequency (e.g. 60 Hz) may be fixed.

As shown in FIG. 20A, when the low driving frequency is 1 Hz and the duration of the low frequency driving mode is greater than ten seconds, twenty or more compensation frames CF having the compensation frame frequency of 60 Hz may be inserted to prevent the shift of the threshold voltage of the switching element. When the low driving frequency is 2 Hz and the duration of the low frequency driving mode is greater than ten seconds, ten or more compensation frames CF having the compensation frame frequency of 60 Hz may be inserted to prevent the shift of the threshold voltage of the switching element. When the low driving frequency is 15 Hz and the duration of the low frequency driving mode is greater than ten seconds, two or more compensation frames CF having the compensation frame frequency of 60 Hz may be inserted to prevent the shift of the threshold voltage of the switching element. When the low driving frequency is 30 Hz and the duration of the low frequency driving mode is greater than ten seconds, one or more compensation frames CF having the compensation frame frequency of 60 Hz may be inserted to prevent the shift of the threshold voltage of the switching element.

In FIG. 20B, for example, the reference time THC may be varied and the compensation frame frequency (e.g. 60 Hz) may be fixed.

As shown in FIG. 20B, when the low driving frequency is 1 Hz and the duration of the low frequency driving mode is greater than ten seconds, twenty or more compensation frames CF having the compensation frame frequency of 60 Hz may be inserted to prevent the shift of the threshold voltage of the switching element. When the low driving frequency is 2 Hz and the duration of the low frequency driving mode is greater than twenty seconds, ten or more compensation frames CF having the compensation frame frequency of 60 Hz may be inserted to prevent the shift of the threshold voltage of the switching element. When the low driving frequency is 15 Hz and the duration of the low frequency driving mode is greater than sixty seconds, two or more compensation frames CF having the compensation frame frequency of 60 Hz may be inserted to prevent the shift of the threshold voltage of the switching element. When the low driving frequency is 30 Hz and the duration of the low frequency driving mode is greater than one hundred and twenty seconds, one or more compensation frames CF having the compensation frame frequency of 60 Hz may be inserted to prevent the shift of the threshold voltage of the switching element.

In FIG. 20C, for example, the reference time THC may be fixed and the compensation frame frequency (e.g. 60 Hz) may be varied.

As shown in FIG. 20C, when the low driving frequency is 1 Hz and the duration of the low frequency driving mode is greater than ten seconds, twenty or more compensation frames CF having the compensation frame frequency greater than 1 Hz may be inserted to prevent the shift of the threshold voltage of the switching element. When the low driving frequency is 2 Hz and the duration of the low frequency driving mode is greater than ten seconds, ten or more compensation frames CF having the compensation frame frequency greater than 2 Hz may be inserted to prevent the shift of the threshold voltage of the switching element. When the low driving frequency is 15 Hz and the duration of the low frequency driving mode is greater than ten seconds, two or more compensation frames CF having the compensation frame frequency greater than 15 Hz may be inserted to prevent the shift of the threshold voltage of the switching element. When the low driving frequency is 30 Hz and the duration of the low frequency driving mode is greater than ten seconds, one or more compensation frames CF having the compensation frame frequency greater than 30 Hz may be inserted to prevent the shift of the threshold voltage of the switching element.

Figure 21:
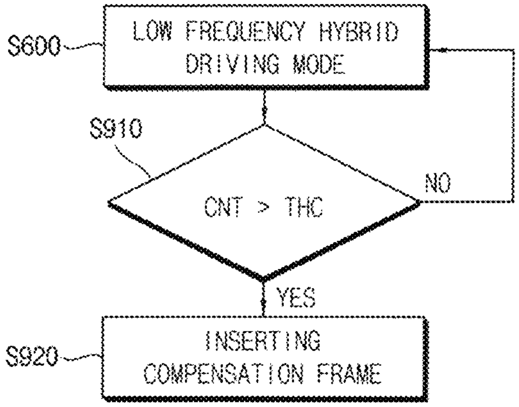
FIG. 21 is a flowchart illustrating an operation of the display panel of FIG. 17 in a low frequency hybrid driving mode.

FIG. 21 is a flowchart illustrating an operation of the display panel of FIG. 17 in a low frequency hybrid driving mode.

Referring to FIGS. 17 to 21, the operation of the low frequency driving mode of FIG. 18 may be similarly applied to the low frequency hybrid driving mode.

When the display panel 100 is operated in the low frequency hybrid driving mode (step S600), the display panel driver may count a duration CNT of the low frequency hybrid driving mode.

When the duration CNT of the low frequency hybrid driving mode is greater than a reference time THC (step S910), a driving signal applied at least one of the switching element of the first type (e.g. the polysilicon thin film transistor) and the switching element of the second type (e.g. the oxide thin film transistor) may be adjusted to prevent the shift of the threshold voltage.

In the present embodiment, when the duration CNT of the low frequency hybrid driving mode is greater than the reference time THC (step S910), the display panel driver may insert a compensation frame CF having a compensation driving frequency greater than the low driving frequency (step S920).

In the low frequency hybrid driving mode, the compensated driving signal GSC may be at least one of the signals GI and GWN having the low driving frequency in FIG. 5B.

Figure 22:
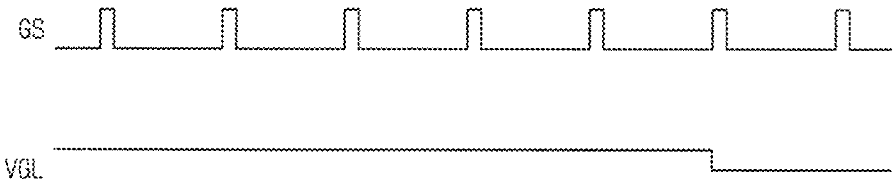
FIG. 22 is a timing diagram illustrating a gate signal and a compensated gate-off voltage applied to a display panel according to an embodiment of the present inventive concept.

FIG. 22 is a timing diagram illustrating a gate signal and a compensated gate-off voltage applied to a display panel according to an embodiment of the present inventive concept.

The display apparatus according to the present embodiment is substantially the same as the display apparatus of the previous embodiment explained referring to FIGS. 17 to 21 except for the method of compensating the threshold voltage of the switching element of the display apparatus. Thus, the same reference numerals will be used to refer to the same or like parts as those described in the previous embodiment of FIGS. 17 to 21 and any repetitive explanation concerning the above elements will be omitted.

Referring to FIGS. 17, 18, 21 and 22, when the display panel 100 is operated in the low frequency driving mode (step S500), the display panel driver may count a duration CNT of the low frequency driving mode.

When the duration CNT of the low frequency driving mode is greater than a reference time THC (step S810), a driving signal applied at least one of the switching element of the first type (e.g. the polysilicon thin film transistor) and the switching element of the second type (e.g. the oxide thin film transistor) may be adjusted to prevent the shift of the threshold voltage.

The data write gate signal GWP and GWN and the data initialization gate signal GI applied to the display panel 100 are generated based on a gate-on voltage VGH and a gate-off voltage VGL.

In the present embodiment, when the duration CNT of the low frequency driving mode is greater than the reference time THC, the display panel driver may decrease a level of the gate-off voltage VGL.

When the level of the gate-off voltage VGL is decreased, an amplitude of the data initialization gate signal GI applied to the fourth pixel switching element T4 of FIG. 2 is increased and the gate-source voltage of the fourth pixel switching element T4 is increased so that a shift of the threshold voltage of the fourth pixel switching element T4 may be compensated.

In addition, when the level of the gate-off voltage VGL is decreased, an amplitude of the data initialization gate signal GI applied to the third pixel switching element T3 of FIG. 2 is increased and the gate-source voltage of the third pixel switching element T3 is increased so that a shift of the threshold voltage of the third pixel switching element T3 may be compensated.

Figure 23:
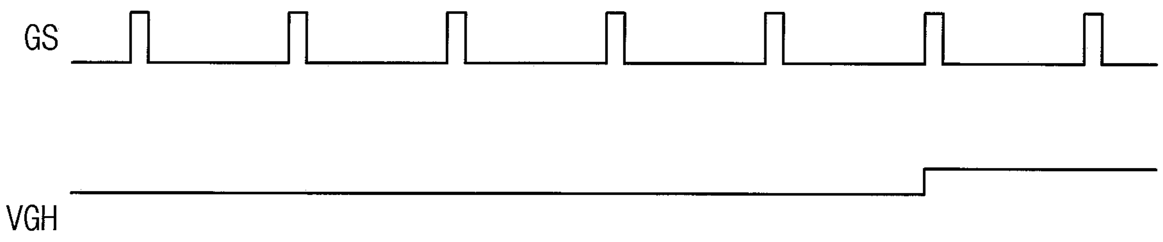
FIG. 23 is a timing diagram illustrating a gate signal and a compensated gate-on voltage applied to a display panel according to an embodiment of the present inventive concept.

FIG. 23 is a timing diagram illustrating a gate signal and a compensated gate-on voltage applied to a display panel according to an embodiment of the present inventive concept.

The display apparatus according to the present embodiment is substantially the same as the display apparatus of the previous embodiment explained referring to FIGS. 17 to 21 except for the method of compensating the threshold voltage of the switching element of the display apparatus. Thus, the same reference numerals will be used to refer to the same or like parts as those described in the previous embodiment of FIGS. 17 to 21 and any repetitive explanation concerning the above elements will be omitted.

Referring to FIGS. 17, 18, 21 and 23, when the display panel 100 is operated in the low frequency driving mode (step S500), the display panel driver may count a duration CNT of the low frequency driving mode.

When the duration CNT of the low frequency driving mode is greater than a reference time THC (step S810), a driving signal applied at least one of the switching element of the first type (e.g. the polysilicon thin film transistor) and the switching element of the second type (e.g. the oxide thin film transistor) may be adjusted to prevent the shift of the threshold voltage.

The data write gate signal GWP and GWN and the data initialization gate signal GI applied to the display panel 100 are generated based on a gate-on voltage VGH and a gate-off voltage VGL.

In the present embodiment, when the duration CNT of the low frequency driving mode is greater than the reference time THC, the display panel driver may increase a level of the gate-on voltage VGH.

When the level of the gate-on voltage VGH is increased, an amplitude of the data initialization gate signal GI applied to the fourth pixel switching element T4 of FIG. 2 is increased and the gate-source voltage of the fourth pixel switching element T4 is increased so that a shift of the threshold voltage of the fourth pixel switching element T4 may be compensated.

In addition, when the level of the gate-on voltage VGH is increased, an amplitude of the data initialization gate signal GI applied to the third pixel switching element T3 of FIG. 2 is increased and the gate-source voltage of the third pixel switching element T3 is increased so that a shift of the threshold voltage of the third pixel switching element T3 may be compensated.

Figure 24:
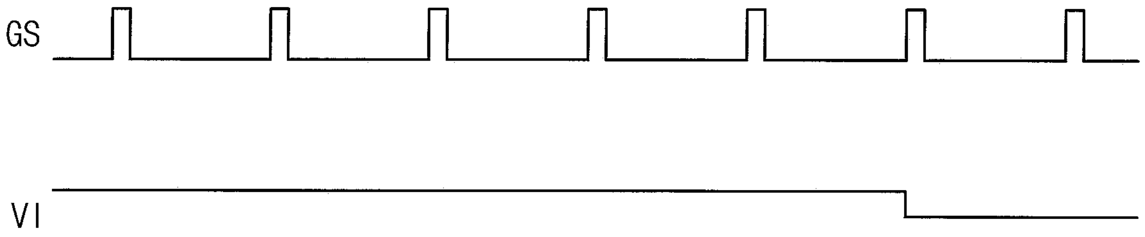
FIG. 24 is a timing diagram illustrating a gate signal and a compensated initialization voltage applied to a display panel according to an embodiment of the present inventive concept.

FIG. 24 is a timing diagram illustrating a gate signal and a compensated initialization voltage applied to a display panel according to an embodiment of the present inventive concept.

The display apparatus according to the present embodiment is substantially the same as the display apparatus of the previous embodiment explained referring to FIGS. 17 to 21 except for the method of compensating the threshold voltage of the switching element of the display apparatus. Thus, the same reference numerals will be used to refer to the same or like parts as those described in the previous embodiment of FIGS. 17 to 21 and any repetitive explanation concerning the above elements will be omitted.

Referring to FIGS. 17, 18, 21 and 24, when the display panel 100 is operated in the low frequency driving mode (step S500), the display panel driver may count a duration CNT of the low frequency driving mode.

When the duration CNT of the low frequency driving mode is greater than a reference time THC (step S810), a driving signal applied at least one of the switching element of the first type (e.g. the polysilicon thin film transistor) and the switching element of the second type (e.g. the oxide thin film transistor) may be adjusted to prevent the shift of the threshold voltage.

The data write gate signal GWP and GWN and the data initialization gate signal GI applied to the display panel 100 are generated based on a gate-on voltage VGH and a gate-off voltage VGL.

In the present embodiment, when the duration CNT of the low frequency driving mode is greater than the reference time THC, the display panel driver may decrease a level of the initialization voltage VI applied to the display panel 100.

When the level of the initialization voltage VI is decreased, the gate-source voltage of the fourth pixel switching element T4 is increased so that a shift of the threshold voltage of the fourth pixel switching element T4 may be compensated.

According to the above explained embodiments, the display panel 100 is driven in a high frequency driving mode, a low frequency hybrid driving mode and a low frequency driving mode so that the flicker of the display panel 100 may be prevented.

In addition, the input image of the display panel 100 is divided into a plurality of segments and the driving frequency of the worst segment that has the highest segment driving frequency is decreased so that the power consumption of the display apparatus may be reduced.

In addition, the shift of the threshold voltage of the switching element may be prevented when the display panel 100 is driven in the low frequency driving mode for a long time. Accordingly, the display defect of the display panel 100 due to the shift of the threshold voltage may be prevented.

Therefore, the display quality deterioration in the low frequency driving mode is prevented so that the power consumption of the display apparatus may be reduced and the display quality of the display panel 100 may be enhanced.

INDUSTRIAL AVAILABILITY

According to the present inventive concept as explained above, the power consumption of the display apparatus may be reduced and the display quality of the display panel may be enhanced.

Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims.

EXPLANATION OF REFERENCE NUMERALS

100: display panel
200: driving controller
300: gate driver
400: gamma reference voltage generator

500: data driver
600: emission driver

What is claimed is:

1. A display apparatus comprising:

a display panel comprising a pixel, the pixel comprising a switching element of a first type and a switching element of a second type different from the first type; and a display panel driver which drives the display panel, wherein the display panel driver is configured to drive the switching element of the first type in a high driving frequency and the switching element of the second type in the high driving frequency in a first mode, wherein the display panel driver is configured to drive the switching element of the first type in the high driving frequency and the switching element of the second type in a low driving frequency lower than the high driving frequency in a second mode, and wherein the display panel driver is configured to drive the switching element of the first type in the low driving frequency and the switching element of the second type in the low driving frequency in a third mode.

2. The display apparatus of claim 1, wherein the switching element of the first type is a polysilicon thin film transistor, and wherein the switching element of the second type is an oxide thin film transistor.

3. The display apparatus of claim 2, wherein the switching element of the first type is a P-type transistor, and wherein the switching element of the second type is an N-type transistor.

4. The display apparatus of claim 2, wherein the pixel comprises:

a first pixel switching element comprising a control electrode connected to a first node, an input electrode connected to a second node and an output electrode connected to a third node;

a second pixel switching element comprising a control electrode to which a first data write gate signal is applied, an input electrode to which a data voltage is applied and an output electrode connected to the second node;

a third pixel switching element comprising a control electrode to which a second data write gate signal is applied, an input electrode connected to the first node and an output electrode connected to the third node;

a fourth pixel switching element comprising a control electrode to which a data initialization gate signal is applied, an input electrode to which an initialization voltage is applied and an output electrode connected to the first node;

a fifth pixel switching element comprising a control electrode to which an emission signal is applied, an input electrode to which a high power voltage is applied and an output electrode connected to the second node;

a sixth pixel switching element comprising a control electrode to which the emission signal is applied, an input electrode connected to the third node and an output electrode connected to an anode electrode of an organic light emitting element;

a seventh pixel switching element comprising a control electrode, an input electrode to which the initialization voltage is applied and an output electrode connected to the anode electrode of the organic light emitting element;

a storage capacitor comprising a first electrode to which the high power voltage is applied and a second electrode connected to the first node; and the organic light emitting element comprising the anode electrode connected to the output electrode of the sixth switching element and a cathode electrode to which a low power voltage is applied.

5. The display apparatus of claim 4, wherein the first pixel switching element, the second pixel switching element, the fifth pixel switching element and the sixth pixel switching element are the polysilicon thin film transistors, and wherein the third pixel switching element, the fourth pixel switching element and the seventh pixel switching element are the oxide thin film transistors.

6. The display apparatus of claim 4, wherein the control electrode of the seventh pixel switching element is connected to the control electrode of the sixth pixel switching element or receives an organic light emitting element initialization gate signal.

7. The display apparatus of claim 4, wherein the first pixel switching element, the second pixel switching element, the fifth pixel switching element, the sixth pixel switching element and the seventh pixel switching element are the polysilicon thin film transistors, and wherein the third pixel switching element and the fourth pixel switching element are the oxide thin film transistors.

8. The display apparatus of claim 1, wherein the first mode is a high frequency driving mode, wherein the second mode is a low frequency hybrid driving mode, wherein the third mode is a low frequency driving mode, wherein when an input image that enters to the display panel driver represents a moving image, the display panel is driven in the first mode, wherein when the input image represents a static image and the display apparatus is in a hybrid driving mode, the display panel is driven in the second mode, and wherein when the input image represents a static image and the display apparatus is not in the hybrid driving mode, the display panel is driven in the third mode.

9. The display apparatus of claim 8, wherein the display panel driver is configured to determine a flicker value of the input image, and wherein the display panel driver is configured to determine the low driving frequency according to the flicker value of the input image.

10. The display apparatus of claim 8, wherein when the input image represents a static image and a difference between a maximum luminance of the input image and a minimum luminance of the input image is equal to or less than a first reference value, the display panel driver is configured to drive the display panel in the second mode, and wherein when the input image represents a static image and the difference between the maximum luminance of the input image and the minimum luminance of the input image is greater than the first reference value, the display panel driver is configured to drive the display panel in the third mode.

11. The display apparatus of claim 8, wherein when the input image represents a static image and a size of an image having a same grayscale value in the input image is greater than a second reference value, the display panel driver is configured to drive the display panel in the second mode, and wherein when the input image represents a static image and the size of the image having the same grayscale value in the input image is equal to or less than the second reference value, the display panel driver is configured to drive the display panel in the third mode.

12. The display apparatus of claim 8, wherein the display panel driver is configured to divide the input image into a plurality of segments and configured to determine segment driving frequencies for the segments, and wherein when an absolute value of a difference between number of worst segments that have a highest segment driving frequency among the segments and number of majority segments that have a most frequent segment driving frequency among the segments, is greater than a third reference value, the display panel driver is configured to drive the display panel in a compensation driving frequency less than the highest segment driving frequency of the worst segment.

13. The display apparatus of claim 12, wherein when the absolute value of the difference between the number of the worst segments and the number of the majority segments is greater than the third reference value, the display panel driver is configured to compensate data of the worst segment.

14. The display apparatus of claim 1, wherein a second data write gate signal and a data initialization gate signal applied to the display panel have the low driving frequency in the second mode, and wherein a first data write gate signal, an emission signal and an organic light emitting element initialization gate signal applied to the display panel have the high driving frequency in the second mode.

15. The display apparatus of claim 1, wherein a first data write gate signal, a second data write gate signal, a data initialization gate signal, an emission signal and an organic light emitting element initialization gate signal applied to the display panel have the low driving frequency in the second mode, and wherein a low power voltage applied to a cathode electrode of an organic light emitting element of the display panel has the high driving frequency in the second mode.

16. A display apparatus comprising:

a display panel comprising a pixel, the pixel comprising a switching element of a first type and a switching element of a second type different from the first type; and a display panel driver which drives the display panel, wherein the display panel driver is configured to drive the switching element of the first type in a high driving frequency and the switching element of the second type in the high driving frequency in a first mode, wherein the display panel driver is configured to drive at least one of the switching element of the first type and the switching element of the second type in the low driving frequency in a second mode, and wherein the display panel driver is configured to count a duration of the second mode, and wherein when the duration of the second mode is greater than a reference time, a threshold shift preventing mode operates during the duration of the second mode, and wherein, in the threshold shift preventing mode, a driving signal applied to at least one of the switching element of the first type and the switching element of the second type is briefly changed which prevents a shift of a threshold voltage of the at least one of the switching element of the first type and the switching element of the second type, wherein after changing the driving signal to prevent the shift in the threshold voltage, the low driving frequency having a same low driving frequency as before changing from the second mode is resumed, and wherein in the threshold shift preventing mode, a compensation frame associated with the driving signal is only added going from a lower driving frequency to a higher driving frequency.

17. The display apparatus of claim 16, wherein when the duration of the second mode is greater than the reference time, the display panel driver is configured to briefly insert the compensation frame having a compensation driving frequency greater than the low driving frequency and thereafter resuming the low driving frequency in the second mode.

18. The display apparatus of claim 16, wherein a data write gate signal and a data initialization gate signal applied to the display panel are generated based on a gate-on voltage and a gate-off voltage, and wherein when the duration of the second mode is greater than the reference time, the display panel driver is configured to decrease a level of the gate-off voltage.

19. The display apparatus of claim 16, wherein a data write gate signal and a data initialization gate signal applied to the display panel are generated based on a gate-on voltage and a gate-off voltage, and wherein when the duration of the second mode is greater than the reference time, the display panel driver is configured to increase a level of the gate-on voltage.

20. The display apparatus of claim 16, wherein when the duration of the second mode is greater than the reference time, the display panel driver is configured to decrease a level of an initialization voltage applied to the display panel.

* * * * *